United States Patent
Shi et al.

(10) Patent No.: US 11,352,783 B2
(45) Date of Patent: Jun. 7, 2022

(54) FABRICATION OF A PHASE CHANGE MATERIAL (PCM) INTEGRATED INSULATION

(71) Applicant: UNIVERSITY OF NORTH TEXAS, Dallas, TX (US)

(72) Inventors: Sheldon Q. Shi, Dallas, TX (US); Weihuan Zhao, Dallas, TX (US); Liping Cai, Dallas, TX (US)

(73) Assignee: UNIVERSITY OF NORTH TEXAS, Dallas, TX (US)

( * ) Notice: Subject to any disclaimer, the term of this patent is extended or adjusted under 35 U.S.C. 154(b) by 0 days.

(21) Appl. No.: 16/774,936

(22) Filed: Jan. 28, 2020

(65) Prior Publication Data
US 2021/0230862 A1  Jul. 29, 2021

(51) Int. Cl.
  *E04B 1/76* (2006.01)
  *C08L 97/02* (2006.01)
  *C08L 91/00* (2006.01)
  *E04B 1/78* (2006.01)

(52) U.S. Cl.
  CPC ............ *E04B 1/7608* (2013.01); *C08L 91/00* (2013.01); *C08L 97/02* (2013.01); *E04B 1/78* (2013.01)

(58) Field of Classification Search
  CPC .................................. E04B 1/7608; E04B 1/78
  See application file for complete search history.

(56) References Cited

U.S. PATENT DOCUMENTS

| | | | | |
|---|---|---|---|---|
| 5,626,936 A * | 5/1997 | Alderman | ............... | F24S 20/61 428/68 |
| 5,770,295 A * | 6/1998 | Alderman | ............... | F24S 20/61 428/68 |
| 7,603,822 B2 * | 10/2009 | Kosny | ..................... | E04C 2/292 52/282.1 |
| 8,881,480 B1 * | 11/2014 | Horwath | ................. | E04C 2/288 52/407.5 |
| 10,088,092 B2 * | 10/2018 | Hwang | ..................... | E04B 1/80 |
| 10,323,410 B2 * | 6/2019 | Ndobo-Epoy | ...... | E04D 13/1606 |
| 10,415,256 B2 * | 9/2019 | Taylor, Jr. | ................ | E04F 13/14 |
| 10,424,821 B2 * | 9/2019 | Iyengar | ................. | F28D 20/021 |
| 10,807,344 B2 * | 10/2020 | Hossieny | ................ | B32B 15/18 |
| 10,858,843 B2 * | 12/2020 | Taylor, Jr. | ............. | E04F 13/077 |
| 10,865,942 B2 * | 12/2020 | Banerjee | ................ | E04B 1/344 |
| 10,982,882 B2 * | 4/2021 | Mahal | ..................... | F24S 25/40 |
| 2005/0042416 A1 * | 2/2005 | Blackmon | ............... | B32B 15/09 428/116 |
| 2005/0055982 A1 * | 3/2005 | Medina | .................... | E04C 2/296 52/782.1 |
| 2007/0094967 A1 * | 5/2007 | Kosny | ..................... | E04B 1/14 52/309.9 |

(Continued)

*Primary Examiner* — Rodney Mintz
(74) *Attorney, Agent, or Firm* — Andrew M. Metrailer; Conley Rose, P.C.

(57) ABSTRACT

A method of making an insulated material comprises melting a phase change material to form liquid phase change material, combining the liquid phase change material with an insulating material, and forming a composite insulation material in response to the combining. The insulating material can be a porous material that comprises a plurality of pores, and the liquid phase change material is disposed in the plurality of pores. The phase change material can also be stored in a container and used as layer in an insulation system.

20 Claims, 13 Drawing Sheets

(56) References Cited

U.S. PATENT DOCUMENTS

| | | | |
|---|---|---|---|
| 2009/0031659 A1* | 2/2009 | Kalfon | E04B 1/803 |
| | | | 52/404.1 |
| 2013/0025817 A1* | 1/2013 | Callaghan | F28D 20/021 |
| | | | 165/10 |
| 2013/0318908 A1* | 12/2013 | Holley | E04C 2/296 |
| | | | 52/741.4 |
| 2015/0056404 A1* | 2/2015 | Sawafta | F28D 20/023 |
| | | | 428/106 |
| 2016/0369936 A1* | 12/2016 | Hwang | B32B 27/06 |
| 2016/0370018 A1* | 12/2016 | Jesus De Sequeira Serra Nunes | F24D 13/024 |
| 2017/0051501 A1* | 2/2017 | Whiting | E04C 2/34 |
| 2018/0094427 A1* | 4/2018 | Ndobo-Epoy | E04C 3/291 |
| 2018/0251986 A1* | 9/2018 | Taylor, Jr. | B32B 13/02 |
| 2018/0287231 A1* | 10/2018 | Iyengar | H01M 10/6552 |
| 2019/0112809 A1* | 4/2019 | Frantz | F24F 5/0021 |
| 2019/0126591 A1* | 5/2019 | Hossieny | B32B 27/08 |
| 2019/0128478 A1* | 5/2019 | Banerjee | B65D 90/022 |
| 2019/0249904 A1* | 8/2019 | Mahal | F24S 80/70 |
| 2020/0018077 A1* | 1/2020 | Taylor, Jr. | E04F 13/0832 |
| 2020/0123766 A1* | 4/2020 | De Graaf | E04B 2/7409 |
| 2020/0377646 A1* | 12/2020 | Cui | C08J 9/0009 |
| 2020/0408471 A1* | 12/2020 | Zhang | C09K 5/063 |
| 2021/0062501 A1* | 3/2021 | Chen | E04F 15/10 |
| 2021/0079662 A1* | 3/2021 | Taylor, Jr. | E04F 13/14 |

* cited by examiner

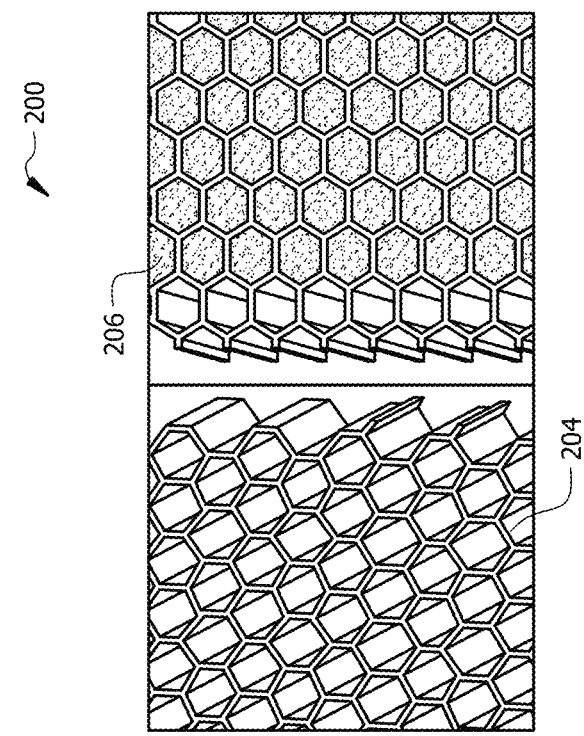
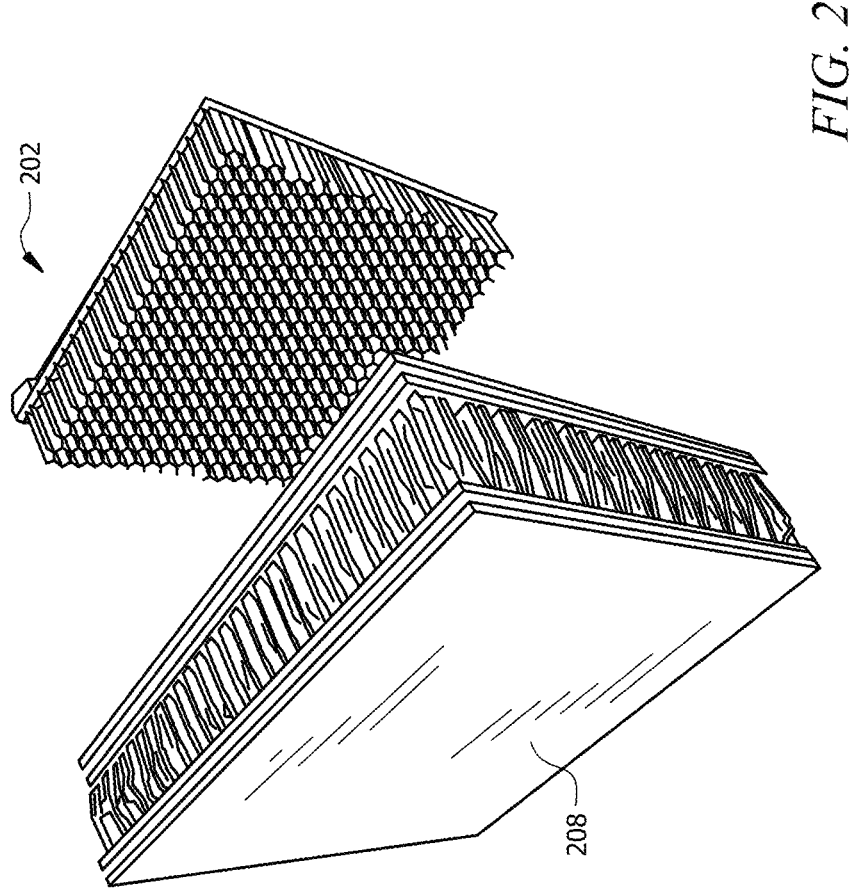
FIG. 2

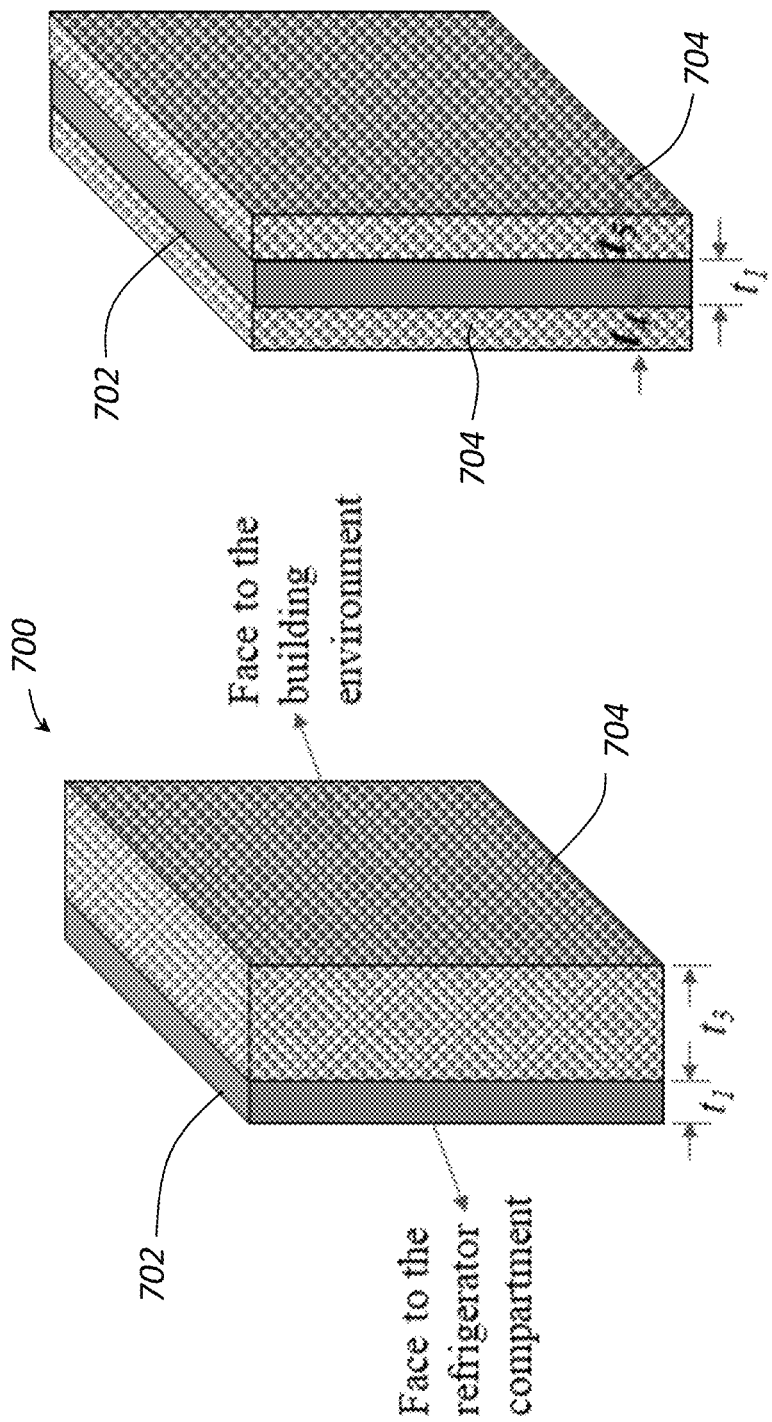

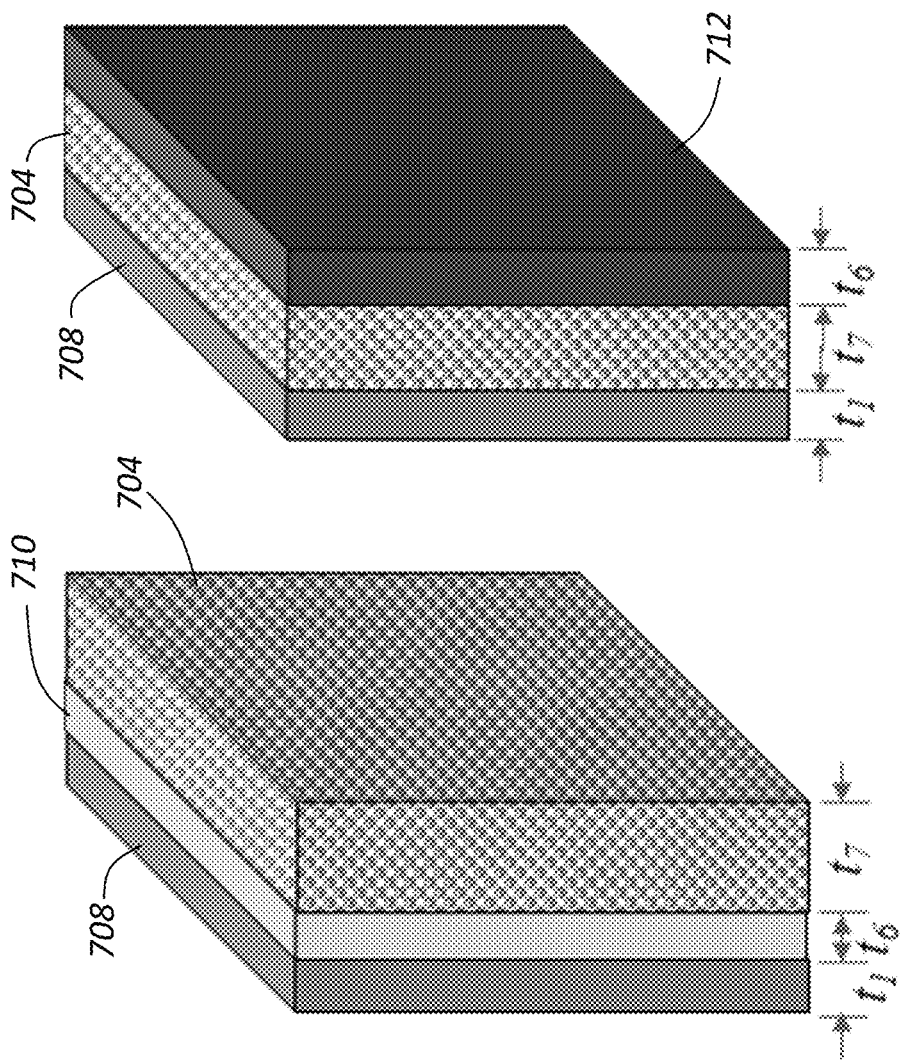

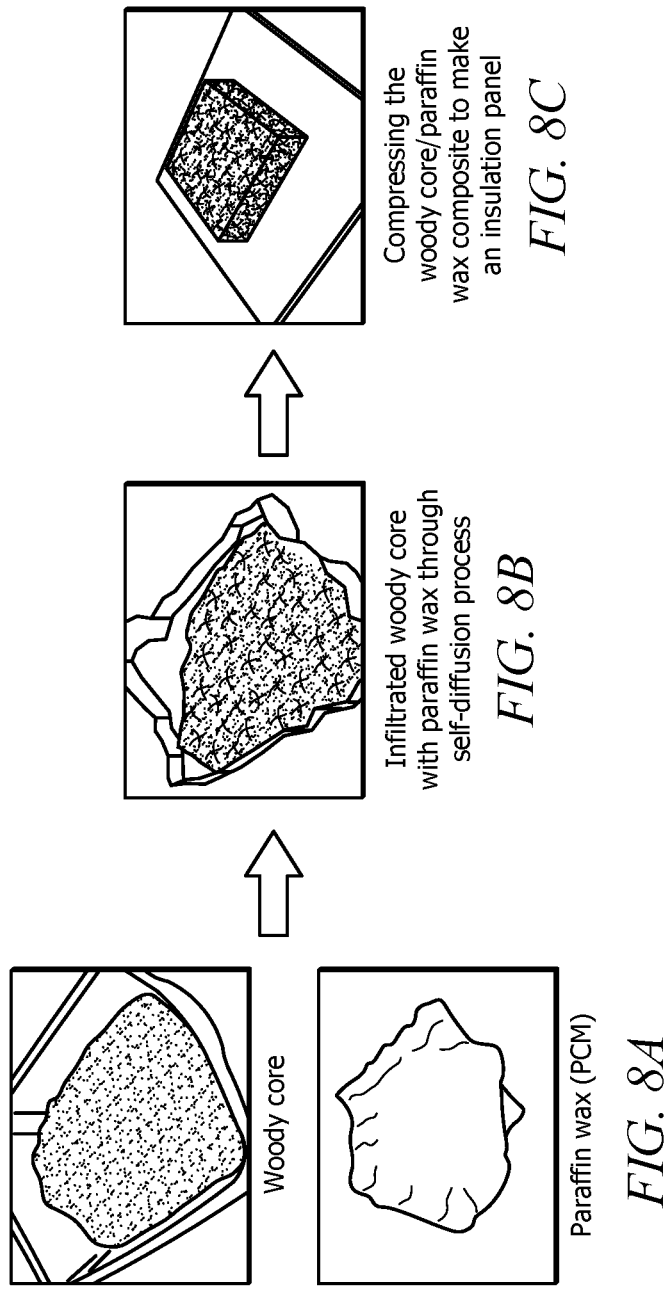

US 11,352,783 B2

FABRICATION OF A PHASE CHANGE MATERIAL (PCM) INTEGRATED INSULATION

CROSS-REFERENCE TO RELATED APPLICATIONS

Not applicable.

STATEMENT REGARDING GOVERNMENTALLY SPONSORED RESEARCH OR DEVELOPMENT

Not applicable.

BACKGROUND

The building sector is a dominant energy consumer with around 40% share of the overall energy consumption and accounts for approximately 39% of the greenhouse gas (GHG) emissions in the United States in 2014 according to the U.S. Department of Energy. Highly insulated building envelopes will help reduce the energy consumption from the heating, ventilation, and air conditioning (HVAC) system as well as the GHG emissions. The amount of insulation in building envelope is often limited due to the high cost and space limitation.

Commercially available building insulation materials are typically a high cost for high R-value or low cost for low R-value. Moreover, many conventional synthetic insulation materials, such as fiberglass, etc., may have negative impacts on the environment. Cellulose insulations, which are processed from biomass are natural, biodegradable, light weight, low cost, and environmental benign, and they are currently commercially available. However, they are usually present lower R-values compared to many synthetic materials, such as fiberglass, mineral wool, expanded polystyrene (EPS) foam, etc.

SUMMARY

In some embodiments, a method of making an insulated material comprises melting a phase change material to form liquid phase change material, combining the liquid phase change material with an insulating material, and forming a composite insulation material in response to the combining. The insulating material can be a porous material that comprises a plurality of pores, and the liquid phase change material is disposed in the plurality of pores.

In some embodiments, an insulated panel comprises an insulation layer, and a composite insulation material disposed on at least one surface of the insulation layer. The composite insulation material comprises a phase change material.

In some embodiments, a method of providing insulation comprises heating a first side of a composite insulation material, melting at least a portion of the phase change material in response to the heating, and reducing heat transmission through the composite insulation material from the first side to the second side based on the melting. The composite insulation material comprises the first side and a second side. The composite insulation material comprises a phase change material. The method can also include reducing the temperature on the first side of the composite insulation material, and solidifying the phase change material in response to reducing the temperature on the first side of the composite insulation material.

These and other features will be more clearly understood from the following detailed description taken in conjunction with the accompanying claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 2 is an illustration of an embodiment of a microencapsulated PCM honeycomb wallboard.

FIG. 7A is a schematic view of a configuration of a composite insulation material used in an insulation system according to an embodiment.

FIG. 7B is another schematic view of a configuration of a composite insulation material used in an insulation system according to an embodiment.

FIG. 7C is still another schematic view of a configuration of a composite insulation material used in an insulation system according to an embodiment.

FIG. 7D is yet another schematic view of a configuration of a composite insulation material used in an insulation system according to an embodiment.

FIG. 7E is another schematic view of a configuration of a composite insulation material used in an insulation system according to an embodiment.

FIG. 8 is an illustration of the fabrication of the woody core/PCM composite according to some embodiments.

DESCRIPTION

Figure 1:
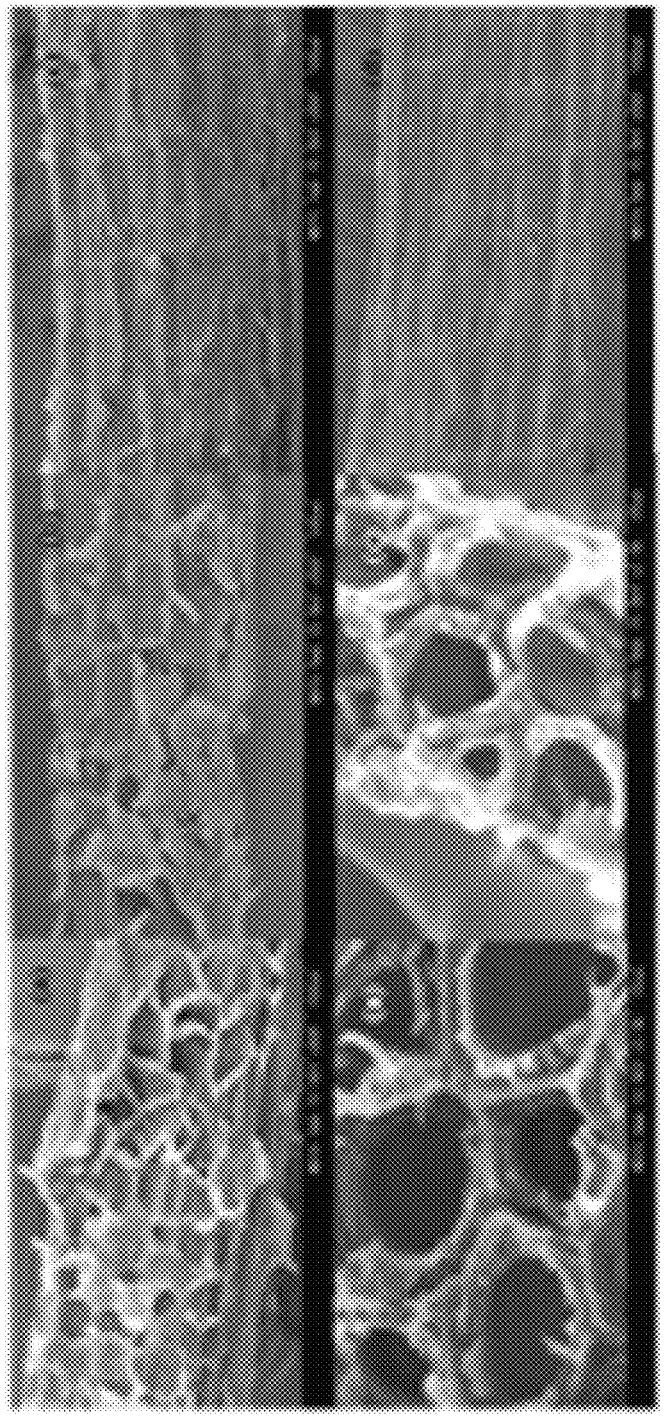
FIG. 1 is an illustration of the porous structure of woody fibers useful in some embodiments.

Disclosed herein are composite insulation materials, insulation systems incorporating such materials, and their use in insulation systems. The materials use one or more phase change materials (PCM(s)) that can experience a phase change at a desired temperature, which can generally be selected to be near the temperature at which the composite insulation materials are being used. The phase change of the material can be used to absorb and store heat at a temperature associated with the melting point or melting point range. This effect can be used with the cyclic nature of heat and/or cold being applied to a building or regulated environment to absorb heat during a peak temperature difference, and then released at a time when the temperature differential across the insulation is reduced. For example, the PCM(s) can be used to transition from a solid to a liquid during the peak heat of the day, and the reconverted to a solid while being cooled later in the day or at night when an air conditioner can operate more efficiently against a lower temperature differential. This can provide significant energy savings for the buildings, maintain temperatures more effectively, and provide higher insulation values for comparative insulation thicknesses.

The insulated material as disclosed herein can include a phase change material (PCM) disposed within another material, such as the pores of a porous material, within an encapsulation within another materials, and/or as an encapsulated layer of PCM. The combination of one or more PCMs with another material can be referred to as a composite insulation material herein. PCMs have phase change characteristics that can allow for the storage and release of relatively large amount of thermal energy (latent heat of fusion) at a nearly constant temperature or over a selected temperature range. This characteristic of PCMs can enhance the thermal inertia and help mitigate peak loads in buildings. The PCM can be stored in a porous material, an encapsulation, or a container that can serve to hold and retain the PCM in use in both the solid and liquid phases. The combination of the PCM within the materials can then serve as an insulation layer or a material within a structure. In some embodiments, the insulation layer can be part of an insulation panel or system. The properties of the composite insulation material can allow for an increase in the insulating properties of an existing insulation layer and/or allow the insulation to have a reduced thickness for the same insulating properties, thereby improving the energy efficiency of various insulated structures.

When the PCM(s) are used with a porous material, the porous material can comprise any suitable material having a sufficient pore volume to retain a desired amount of the PCM(s). The porous material can comprise various organic materials such as biomass, polymers, polymeric foams, and the like as well as inorganic materials such as mineral insulation, porous concrete, and the like. In some embodiments, the porous material can comprise various types of materials such as porous biomass, a porous polymer, porous lignocellulosic fibers, porous polyurethane foams, porous expanded polystyrene, porous air-entrained concrete, porous rock wool, porous polyisocyanurate material, porous natural plant material, partially delignified lignocellulosic biomass, and combinations thereof.

The porous material can also comprise other types of materials such as PVC, honeycomb, plastic, stainless steel, and aluminum panels, any of which can also be used to encapsulate PCM(s). The PCM(s) can also be incorporated into or impregnated within traditional insulation materials, such as polyurethane (PU) foam, fiberglass, cellulose fiber, Structural Insulated Panel (SIP), or combinations thereof either directly or through the use of an encapsulated PCM(s).

As an example, biomass, such as cellulosic fiber and woody core from kenaf or hemp, has a porous structure, which the PCM can be deposited into. FIG. 1 illustrates a micrograph of the porous structure of biomass as an example. The typical R-value of cellulosic insulation is around 3-3.5 per inch thickness, which is lower than other conventional synthetic insulations (e.g., polyurethane (PU) foam's R-value is in the range of 5-7 per inch thickness). In some embodiments, the PCM(s) can be impregnated into the pore structures of a porous material such as cellulose from biomass for insulation to enhance the thermal energy storage capacity of the insulation material due to the latent heat of fusion. In some embodiments, the effective R-value (as defined herein) of the porous material having the PCM(s) impregnated therein can be greater than 7 per inch, greater than 8 per inch, greater than 9 per inch, or greater than 10 per inch.

In some embodiments, the PCM(s) can be incorporated into the porous material during construction to form the pores within the material. For example, conventional construction materials, such as gypsum board, concrete, brick and plaster, can be used to retain the PCM(s), and in some embodiments, the PCM(s) can be disposed within the material as it is formed, as described in more detail herein.

The PCM(s) can be selected to have a melting point or melting temperature range at a temperature associated with the use of the composite insulation material. In some embodiments, the PCMs can be selected based on the building temperature range. PCMs with melting temperatures of 15-60° C. may be suitable for residential and/or commercial structures that can be maintained at approximately room temperature. The PCMs can include, but are not limited to, inorganic substances (e.g., hydrated salts), organic substances (e.g., paraffin wax), and/or fatty acids. In some embodiments, the PCM(s) can comprises 1-dodecanol, n-octadecane, polyethylene glycol 900, 1-tetradecanol, medicinal paraffin, a paraffin wax, paraffin RT60/RT58, biphenyl, $CaCl_2 \cdot 6H_2O$, $Na_2SO_4 \cdot 10H_2O$, $Na_2CO_3 \cdot 10H_2O$, capric acid, lauric acid, myristic acid, palmitic acid, stearic acid, or combinations thereof. In some embodiments, the PCM(s) can also include bio-based PCMs to improve the energy performance of insulating materials. Non-limiting examples of such PCMs can include, but are not limited to, organic-based materials made from plant-derived PCMs such as soy oil, palm oil, and the like. These materials have the property of being less flammable than some other organic PCMs, biodegradable, environmentally friendly, and relatively low cost. Table 1 provides some exemplary PCMs that can be used for building applications.

TABLE 1

| PCM | Melting Temp. (° C.) | Thermal Latent Heat of Fusion (kJ/kg) | Conductivity (W/m · k) | Density (kg/m³) |
| --- | --- | --- | --- | --- |
| $CaCl_2 \cdot 6H_2O$ | 29 | ~190 | 0.5-1.0 | 1710 |
| Commercial Paraffin wax | 53-65 | 190-250 | ~0.2 | 800-930 |
| Myristic Acid | 52.2 | 182.6 | n.a. | 990 |

The PCM(s) can also be used for colder environment such as coolers, refrigerators, freezers, and the like. The PCM(s) for these uses can be selected based on the melting temperature of the components, which can be chosen to match the desired regulated temperatures and/or ambient temperatures as described in more detail here. The PCM(s) for cooler, refrigerator, and freezer application can comprise various inorganic materials, organic materials, and fatty acids in addition to other components (e.g., commercial components that can serve as PCMs, etc.). In some embodiments, suitable PCM materials can include, but are not limited to, $LiClO_3 \cdot 3H_2O$, $ZnCl_2 \cdot 3H_2O$, Eutectic water-salt solution: 22.4-23.3 wt. % NaCl solution, Paraffin C14, Paraffin C15-C16, Polyglycol E400, Formic acid, propyl palmitate, isopropyl palmitate, RT 5 (Paraffin; available from Rubitherm GmbH), RT 5 HC (Paraffin; available from Rubitherm GmbH), PureTemp 4 (Biobased product; available from PureTemp LLC), ClimSel C7 (Salt hydrate; available from Climator), RT 8 (Paraffin; available from Rubitherm GmbH), RT 8 HC (Paraffin; available from Rubitherm GmbH), PureTemp 8 (Biobased product; available from PureTemp LLC), RT9 (Paraffin; available from Rubitherm GmbH), RT 10 (Paraffin; available from Rubitherm GmbH), RT 10 HC (Paraffin; available from Rubitherm GmbH), PureTemp −21 (Biobased product; available from PureTemp LLC), TH-21 (Salt hydrate; available from TEAP), SN21 (Salt solution; available from Cristopia), STL-21 (Salt solution; available from Mitsubishi Chemical), SN18 (Salt solution; available from Cristopia), TH-16 (Salt solution; TEAP), STL-16 (Salt solution; available from Mitsubishi Chemical), SN15 (Salt solution; available from Cristopia), PureTemp −15 (Biobased product; available from PureTemp LLC), and combinations thereof. Table 2 below provides some exemplary PCMs that can be used for cooler, refrigerator, and freezer applications.

TABLE 2

| PCM | Melting Temp. (° C.) | Latent Heat of Fusion (kJ/kg) |
|---|---|---|
| $LiClO_3 \cdot 3H_2O$ | 8.1 | 253 |
| $ZnCl_2 \cdot 3H_2O$ | 10 | — |
| Eutectic water-salt solution: 22.4-23.3 wt. % NaCl solution | −21.2 | 222-233 |
| Paraffin $C_{14}$ | 4.5 | 165 |
| Tetradecane | 5.5 | 215 |
| Paraffin $C_{15}$-$C_{16}$ | 8 | 153 |
| Polyglycol E400 | 8 | 99.6 |
| Formic acid | 8 | 277 |
| Propyl palmitate | 10 | 186 |
| Isopropyl palmitate | 11 | 95-100 |
| RT 5 (Paraffin; Rubitherm GmbH) | 5 | 180 |
| RT 5 HC (Paraffin; Rubitherm GmbH) | 5 | 250 |
| PureTemp 4 (Biobased product; PureTemp LLC) | 5 | 187 |
| ClimSel C7 (Salt hydrate; Climator) | 7 | 130 |
| RT 8 (Paraffin; Rubitherm GmbH) | 8 | 175 |
| RT 8 HC (Paraffin; Rubitherm GmbH) | 8 | 190 |
| PureTemp 8 (Biobased product; PureTemp LLC) | 8 | 178 |
| RT9 (Paraffin; Rubitherm GmbH) | 9 | 175 |
| RT 10 (Paraffin; Rubitherm GmbH) | 10 | 160 |
| RT 10 HC (Paraffin; Rubitherm GmbH) | 10 | 200 |
| PureTemp-21 (Biobased product; PureTemp LLC) | −21 | 239 |
| TH-21 (Salt hydrate; TEAP) | −21 | 222 |
| SN21 (Salt solution; Cristopia) | −21 | 240 |
| STL-21 (Salt solution; Mitsubishi Chemical) | −21 | 240 |
| SN18 (Salt solution; Cristopia) | −18 | 268 |
| TH-16 (Salt solution; TEAP) | −16 | 289 |
| STL-16 (Salt solution; Mitsubishi Chemical) | −16 | — |
| SN15 (Salt solution; Cristopia) | −15 | 311 |
| PureTemp-15 (Biobased product; PureTemp LLC) | −15 | 301 |

Other PCM compositions are possible based on the desired melting temperature of the PCM(s), which can depend on the specific temperature of the location being regulated. For example, commercial processes maintaining higher temperatures than buildings can utilize higher melting point PCM(s).

There can be advantages and disadvantages of using inorganic and organic materials as PCMs. Inorganic materials such as hydrated salts can have higher volumetric thermal energy storage capacity, a higher volumetric phase change enthalpy, are non-flammable, and can have a lower costs. However, such inorganic materials can suffer from supercooling and phase separation issues while potentially being corrosive and lacking thermal stability. Organic materials may not have such problems to such an extent and tend to be more chemically and thermally stable. However, organic materials (e.g., paraffin wax, fatty acids, etc.) can be flammable, which can require additional components to control.

In some embodiments, mixtures of PCMs can be used with the porous materials. Mixtures of PCM(s) can have melting point ranges that may allow the PCM(s) to melt over a broader temperature range than a pure component alone. The resulting mixture may then be useful over a broad range of expected operating temperatures. The specific composition of the mixture can be selected for a desired melting temperature range selected for the location of the insulation. Further, the specific composition can be selected and blended to provide the desired melting point range, for example spanning a small temperature range (e.g., between about 1 to 10° C.), or a broader melting temperature range (e.g., between about 10 to 50° C.).

The PCM(s) can be combined with the insulation materials (e.g., a porous material) in any suitable amount. In general, the use of the PCM(s) may store heat, and a larger amount of PCM(s) in the porous material may be capable of storing larger amounts of heat. Increased amounts of the PCM(s) may be prone to leakage problems as well as being limited by the pore volume present in the porous material. In some embodiments, the PCM(s) may be used with the porous materials in a weight ratio of between about 10:1 and 1:10, depending on the selection of the porous material and the PCM(s).

In some embodiments, the PCM(s) can be present as macroencapsulated PCM(s), microencapsulated PCM(s), nano-encapsulated PCM(s), and/or shape-stabilized PCM(s). In these embodiments, the PCM(s) can be encapsulated to retain the PCM within the layer. The use of encapsulation or shape stabilization can allow the material to be incorporated into a porous or non-porous material in a defined form while preventing or reducing movement or leakage of the PCM(s) during use. Various materials can be used to encapsulate or stabilize the PCM(s) such as bio-based polymers, gelling agents, polymeric materials, or the like.

In some embodiments, the PCM(s) can be encapsulated in storage structures such as pipes, panels, containers, or the like. In these embodiments, the PCM(s) can be encapsulated in the storage containers, which can then be incorporated within a SIP to form an insulating material. The storage structures can serve to prevent leakage of the PCM(s) during use while effectively transferring heat into and out of the PCM(s).

The PCM(s) can be converted into the liquid phase during use, and the liquid PCM(s) may migrate within the material or the insulation when they are in the liquid phase. In addition, the PCM(s) can vaporize and have vapor leakage of the PCM(s) from the porous materials. In some embodiments, a binder can be used with the PCM(s) to help to bind the PCM(s) in place within a porous material to thereby retain the PCM(s) in the porous material even when in the liquid or vapor phase. The binder can be combined with the PCM(s) to form a mixture and impregnated within the porous material along with the PCM(s). In some embodiments, the binder can be used as a coating on the porous material having the PCM(s) disposed therein. A small amount of binder, such as epoxy, can allow the PCM to be bonded to the porous material. In some embodiments, the binder can be used to form a seal on an outer layer of the porous material to retain the PCM(s) within the porous material even when in the liquid phase. The resulting coating or layer can absorb within a portion of the pores of the porous material and can partially mix with the PCM(s) to some degree during the formation process. In some embodiments, one or more binders can be mixed with the PCM(s) during the impregnation process of the porous material, and an additional coating layer can be applied to an outer surface of the porous material when formed into a layer or panel to further retain the PCM(s) within the porous material during use.

Various binders can be used to increase the bonding between the PCM(s) and porous materials. In some embodiment, a resin or curable material such as an epoxy can be used as the binder. The binder can then cure during the preparation process to retain the PCM(s) in the porous material. The binder may be an epoxy. Suitable epoxy compositions can include, but are not limited to, epoxy, phenoxy, alkyd, acrylic, vinyl, polyester, polyurethane resins, vinyl acetate/ethylene copolymer emulsions, high solids epoxies, acrylics, amine-cured epoxies, water-based latex, and/or combinations thereof. The binder can be a one part or two-part formulation. In some embodiments, the binder can be present in the in an amount of between about 0.1 wt. % and about 10 wt. %, or between about 0.5 wt. % and about 8 wt. % with respect to the weight of the PCM(s).

The insulating material can also comprise a film coating in some embodiments. The film can be coated on an external surface of the composite insulation material with the PCM(s) disposed therein. The film can serve to retain the PCM(s) within the composite insulation material during use. This may be useful for PCM(s) that can sublimate, evaporate, or leak during use in either a solid or liquid phase. For example, some organic PCM(s) may evaporate during use. The thin film can then serve as a barrier to such evaporation to prevent the migration of the PCM(s) out of the composite insulation material over time, which can degrade the insulating properties of the composite insulation material.

As an example, the use of biodegradable porous materials with PCM(s) (e.g., organic or bio-based PCM(s)) impregnated within the porous structures of the biomass fiber can suffer from leaking of molten PCM at elevated temperatures. The use of a thin film can help to eliminate or significantly reduce such leaking, thereby resulting in an effective PCM modification on the biomass insulation such that the insulating properties of the biomass/PCM insulation is significantly improved.

When present, various types of films can be used. In some embodiments, the film can be a polymeric film (e.g., cellophane, polyurethane based files, polyvinyl chloride based files, etc.), a biobased film such as a soy based thin film, a metallic film (e.g., a foil, facing, etc.), or the like. When polymeric or biobased films are used, they can be heat sealed onto a composite insulation material to help to bind to and seal in the surface of the composite insulation material. In some embodiments, one or more layers of metal can be used to prevent leakage from the porous material, and the metallic films can have a thickness from about 10 microns to about 8 mm. Thin films or foils can be used in addition to or in place of polymeric based films to help to reduce leaking from the porous materials. Other films or panels, such as PVC, honeycomb, plastic, stainless steel, and aluminum panels, can also be used to encapsulate the PCMs.

To address one of the key risks of both flammable insulation materials (e.g., biodegradable materials, polymeric porous materials, etc.) and some organic PCM(s) such as paraffin wax, which are flammable materials, an optional fire retardant treatment can be used with the composite insulation material. The fire retardant treatment can be combined with the PCM(s) during formation of the materials, applied to the porous materials prior to impregnation of the PCM(s), and/or applied to a surface of the porous material after impregnation with the PCM(s). Various fire retardant treatments and composition, such as various organic acids (e.g., boric acid, carboxylic acid, etc.), organohalogen based fire retardants (e.g., bromine based fire retardants), organophosphorous fire retardants, and the like, can be used for the composite material to meet the ASME fire retardant standard for the building envelope material.

The PCM(s) can be disposed within the porous material in a number of ways. As shown in FIG. 1, the PCM(s) can be disposed within the pores of the porous material such as bio-based porous materials. The pores can be pre-existing in such materials as a result of their inherent structures. In some embodiments, the pores can be formed in the porous material along with impregnation of the PCM(s). For example, concrete, gypsum, or other materials can be formed in a liquid state and the PCM(s) can be combined with the materials in the liquid state to form an emulsion. In some embodiments, the PCM(s) can be encapsulated prior to or during this process to form encapsulated PCM(s) within the final structure, as described in more detail herein. Upon curing or drying, the porous material can encapsulate the PCM(s) within the material, thereby capturing the PCM(s) in place in the final materials.

In one non-limiting example of a resulting composite insulation material, woody core from kenaf (*Hibiscus cannobinus* L) or hemp (*Cannabis*) can be used as biomass feedstocks. Compared to other biomass fibers, the woody core has a higher pore volume, and thus has much lower density. Because of this reason, the kenaf or hemp woody core has been used as bioabsorbent in some uses. For the same reason, the woody core is a good candidate to be used as an insulation material for building constructions. Some suitable PCMs are hydrophobic, such as paraffin wax. The kenaf or hemp woody cores are more hydrophobic compared to other lignocellulosic fibers. Therefore, kenaf or hemp may be more compatible to the hydrophobic paraffin wax treatment. The resulting composite material can be used to accomplish a high "effective" R-value composite for efficient building energy savings.

In one non-limiting example, woody core from kenaf (*Hibiscus cannobinus* L) or hemp (*Cannabis*) is used as biomass feedstocks. Kenaf or hemp woody core has been underutilized. Compared to other biomass fibers, the woody core has much higher pore volume, and thus has much lower density. Because of this reason, the kenaf or hemp woody core has been used as bioabsorbent (www.kengro.com). For the same reason, the woody core is a good candidate to be used as an insulation material for building constructions. Most of the PCMs are hydrophobic, such as paraffin wax. The kenaf or hemp woody cores are more hydrophobic compared to the bast fibers or other lignocellulosic fibers. Therefore, it is more compatible to the hydrophobic paraffin wax treatment.

The PCM(s) can be provided within the insulating material in a number of ways. As noted above, the PCM(s) can be stored in the pores within a porous material, which can be formed into panels that can be combined with other insulating materials. In some embodiments, the PCM(s) can be captured in a structure that can store the PCM(s) and allow the encapsulated PCM(s) to be incorporated into an insulating layer. For example, the PCM(s) can be provided as macroencapsulated PCM(s), microencapsulated PCM(s), nano-encapsulated PCM(s), and/or shape-stabilized PCM(s). In these embodiments, the PCM(s) can be incorporated into a material such as an insulation material or porous material that can be formed into a panel or other insulating structure.

For example, insulating materials such as foam board can be formed with the PCM(s) to improve the insulating properties. In some embodiments, the insulating material can be a polyurethane foam that can incorporate encapsulated or unencapsulated PCM(s) to form a polyurethane-PCM composite material. The PCM(s) can be incorporated during the manufacturing process of the polyurethane board so that the PCM(s) are retained within the cured foam itself. The resulting composite insulation materials can have improved temperature buffering to help retain temperatures and improve the insulating properties of the materials.

FIG. 2 illustrates a perspective view of another embodiment 200 of encapsulated PCM(s) 206 within a panel based construction 202. As shown, the PCM(s) 206 can be disposed within containers such as pores, holes, or the like within the panel 202. As shown in FIG. 2, the container can be in the form of a honeycomb structure 204 that can be used to contain the PCM(s) 206. The PCM(s) can comprise any of those described herein. The resulting containers with the PCM(s) therein can form the panel 202 with two covers 208 used to seal the panel 202. The resulting panel 202 can then be used as an insulating material or layer within a building or insulating structure.

Using a container as described with respect to FIG. 2 can provide a high storage capacity of the PCM(s) 206 within the panel 202. In order to account for the additional work used to prepare such panels, they can be pre-prepared in a desired size and shape for use in a building structure. In some embodiments, the encapsulated PCM(s) can be used with other materials such as the drywall or concrete. This use of the encapsulated PCM(s) in such materials may not affect the strength of the materials while still providing a less expensive and workable solution on site. Such materials can lead to an improved thermal inertia as well as lower inner temperatures for the panels and structure.

Figure 3:
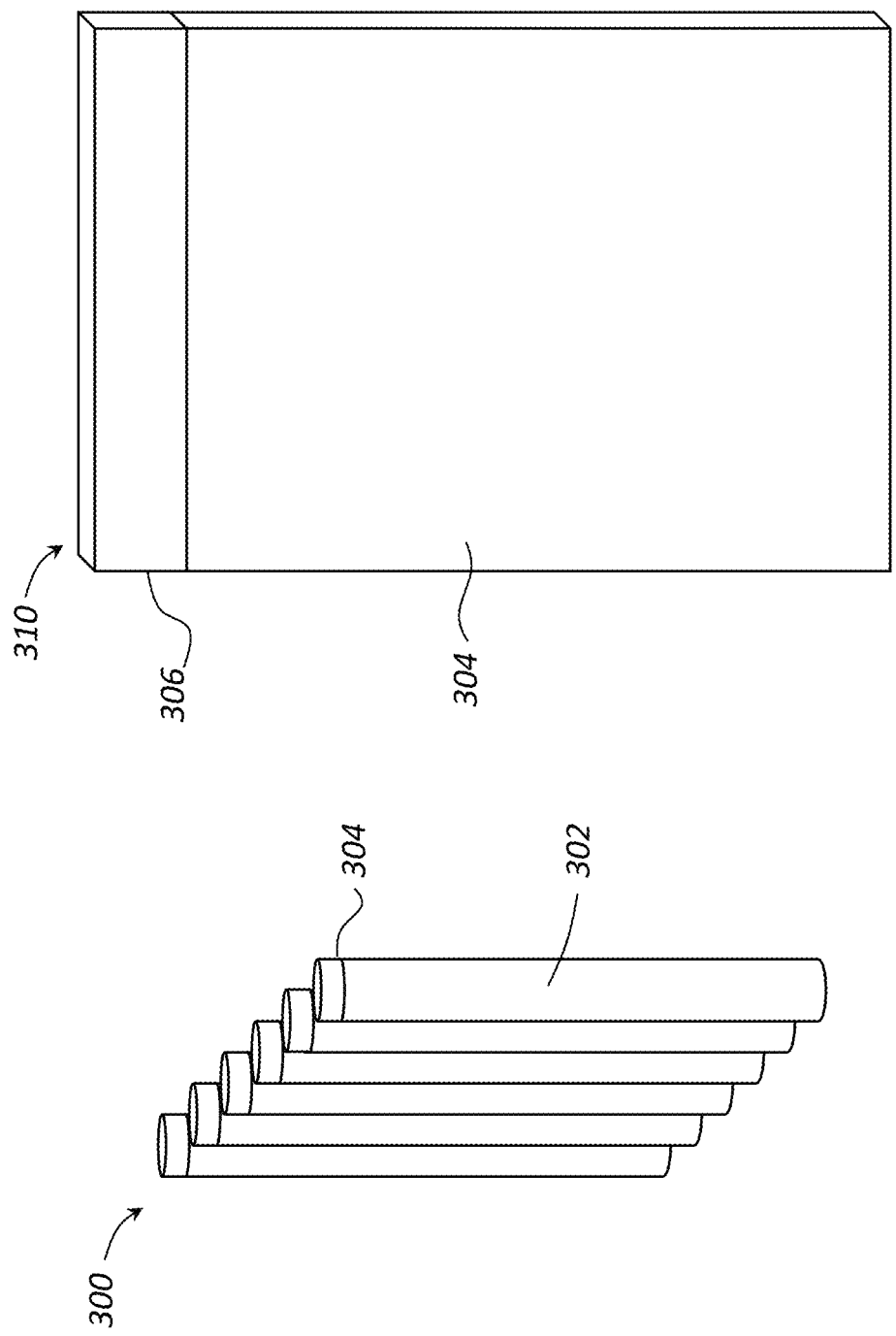
FIGS. 3A and 3B are schematic illustrations of encapsulated PCM(s) according to some embodiments.

In some embodiments, the insulating materials can comprise macro-encapsulated PCM(s) such as storing the PCM(s) in containers or storage structures such as pipes. As shown in FIG. 3A, an encapsulation system 300 can comprise the PCM(s) 304 being encapsulated in one or more pipes 302. In this embodiment, the PCM(s) can be stored in a storage structure comprising one or more pipes 302. When pipes are used, the pipes 302 can be formed from a thermally conductive material such as a metal (e.g., copper, steel, etc.). Once filled, the storage structure can be sealed to encapsulate the PCM(s) 304. The resulting storage structures can then be embedded within SIPs to form a PCM based insulating material. In some embodiments as shown in FIG. 3B, the PCM(s) 304 can be stored in a container 310 that can comprise a flat geometry to match a layer in an insulation system. For example, a panel like container 310 that can be a tank or vessel 306 can be formed having a sheet-like configuration that can be filled with the PCM(s) 304. The container 310 can then be used as a layer in an insulation system.

Figure 4:
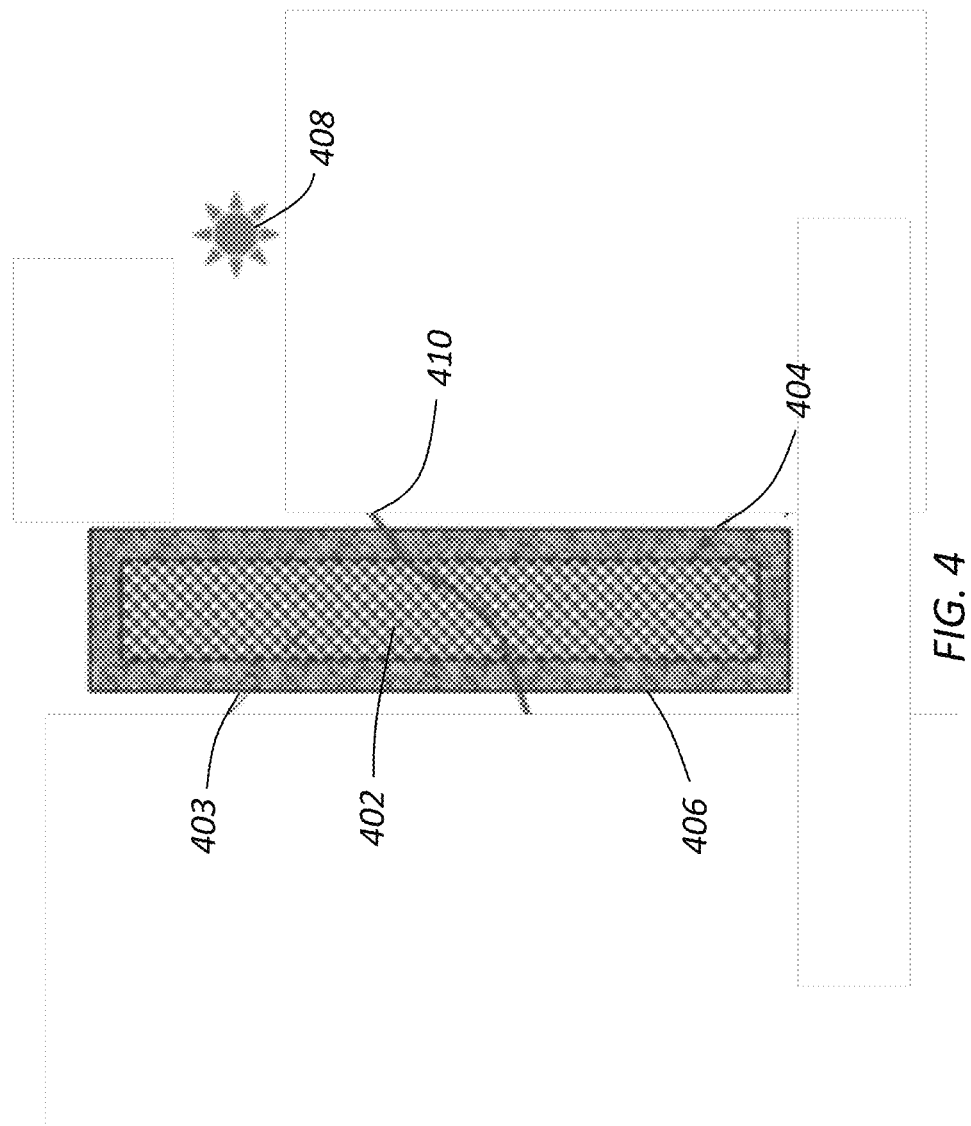
FIG. 4 is an illustration of an embodiment of a construction of a wall integrated with biomass/PCM based insulation for peak temperature mitigation.

The resulting composite insulation material can be used to form a panel or layer within an insulation system (e.g., comprising one or more layers of the composite insulation material along with one or more optional layers of insulation materials). For example, the composite insulation material comprising the PCM(s) can be cast, pressed, or formed into a panel that can be used alone or with other insulating materials to form an insulation system. FIG. 4 shows a construction of wall integrated with a composite insulation material as described above. As shown, the composite insulation material 402 can be disposed within a wall structure 403 that can comprise additional insulating layers. The wall structure 403 can have a first side 404 that can be exposed to a varying temperature source 408, such as the sun. A second side 406 can be adjacent or facing an ambient environment that is being regulated such as the interior of a building. The first side 404 can be considered the high temperature side, and the second side 406 can be considered the low temperature side. As illustrated, the temperature profile 410 can be higher on the first side 404 and lower on the second side 406. As also shown, the temperature profile may be non-linear within the wall structure 403 as a result of the presence of the composite insulation material 402 comprising the PCM(s) impregnated therein. While shown as a potential wall structure 403, other types of building structures are also contemplated such as walls, floors, ceilings, shutters, windows, and the like to allow for efficient building temperature control, all of which are considered building structures.

When formed as panels, the composite insulation materials can have interlocking structures on the edges. The interlocking structures can be designed to fit together so that when two adjacent wall panels are assembled to form the wall construction, the interlocking strictures of one wall panel can interlock with reciprocal interlocking structures of the adjacent wall panel. Interlocking structures may be shaped as an arrow and receptacle, a rib and groove, interlocking channels, snap fit arrangements, or the like. When constructed, the panels may be seamlessly connected such that interlocking means are designed so that a flat external surface is provided, particularly on the interior side of the wall construction. It is advantageous that the connection points between adjacent wall panels be visible from outside the wall only as a thin seam, the external surfaces of the wall panels together forming an uninterrupted flat surface, except for the seam.

The panels formed from the composite insulation materials may have various heights, widths, and thicknesses. Exemplary heights and widths may range from 3'-12' or may range from 1-4 meters. For wall construction, the panels can be constructed according to standard building sizes, for example matching drywall shapes and sizes or fitting between studs forming the walls. Thus, heights from about 4 feet (1.2 meter) or higher, for example from 7 feet (2.1 meter) or 8 feet (2.4 meter) up to about 15 feet (4.6 meter) can be suitable. A thickness of the panels may range from 0.25" to 24", depending on the whether or not any other layers are used in the insulation system and the available space for the insulation system.

Figure 5:
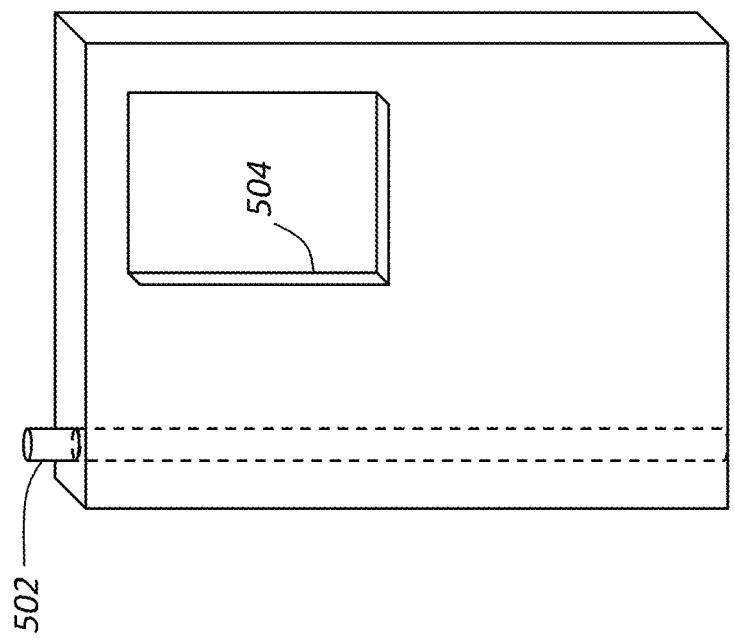
FIG. 5 is an illustration of a panel constructed using a composite insulation material having features according to some embodiments.

The panels can also contain a number of additional features that can be formed as part of the panel formation process or formed after a panel is created. For example, FIG. 5 illustrates the panels containing optional structures, such as a conduit 502 for services such as data, phone, cable, electrical, plumbing, heating, ventilation, air conditioning and the like. In some embodiments, the panels may have reinforcing supports such as rebars, long fibers, and the like.

Note that supports can have other uses besides providing structural support for the panel. For example, supports may also be piping/conduit for plumbing, drains, air vents, electrical, cable, data and phone lines, heating, ventilation air conditioning components, and the like.

In some embodiments, the panels may have openings 504 for any desired windows, doors, or the like, and the openings can be made by cutting appropriately sized and positioned holes through the assembled panel system before adding the load-bearing material. If desired, these openings can be made on-site, or can be pre-cut into the wall panels at the point of their manufacture. The periphery of the opening can then be framed out prior to forming the load bearing material. Pre-manufactured window or door seats can be used for this purpose. Advantageously, the framing can adhere to the load bearing material. After the wall construction is completed, the door or window casing can be attached to the framing and trimmed out as desired.

In some embodiments, the panels may have other structural or functional components to the form an assemblage, such as, for example, a moisture or vapor barrier sheet or film. This sheet can be the same as the film applied for purposes of preventing leakage of the PCM(s) from the composite insulation material, or it can be a different or additional layer. For convenience, the moisture or vapor barrier film may be attached to the inside surface of either or both of the interior and exterior wall panels or to either or both sides of the insulating foam panels prior to assembling the form assemblage. Other structural or functional components include, for example, protruding bolts or other fasteners for attachment of a roof, eaves, ceiling, trusses, and the like; cut-outs for joists, rafters and the like, protruding reinforcing rods or bars, and the like.

Figure 6:
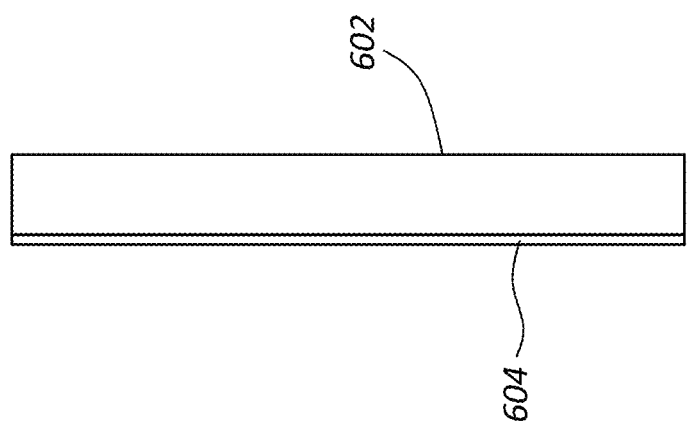
FIG. 6 illustrates a panel constructed using a composite insulation material having a facing according to some embodiments.

In some embodiment, the panels may have one or more facers employed in a panel formed from a composite insulation material, as shown in FIG. 6. Metal facers 604 employed in the composite panels 602 may be one or more of galvanized steel, stainless steel, copper, aluminum, metal foils of aluminum or steel, strip steel, coiled steel, or other appropriate metal material. The metal is preferably coiled steel. The metal surface may be zinc-coated, aluminum/zinc coated, zinc/iron coated, hot-dip galvanized to provide corrosion resistance or the metal facer may be exposed to other treatment steps such as chemical cleaning, plating, and thermal treatment. A typical thicknesses of a metal facer can be less than 8 mm, and it may be as thin as 10 microns (foil). Preferred steel facers have a thickness of from 0.8 to 0.3 mm. Other facer materials such as reinforced fiber board, oriented strandboard, or reinforced paper may also be used.

In some embodiments, the panels may have an intumescent coating employed in providing fire resistance to the composite insulating panel. The components of an intumescent coating can generally comprise a binder (such as epoxy or latex), a catalyst (such as an acid donor like ammonium polyphosphate), a blowing agent or spumific (such as melamine), and a polyhydridic carbon donor that forms a char on application of heat. These intumescent coatings are of the type that provide an insulating char barrier having a thickness many times their original thickness at char temperatures of approximately 200-300° C. Often, the thickness can reach a height of 1 mm and greater when exposed to a temperature of 500° C. for 5 minutes. This thick carbon char offers thermal protection to the underlying substrate in that it limits heat transfer through the panel thus greatly reducing thermal decomposition, charring, melting, and formation of flammable or pyrophoric gases which can be generated from pyrolysis or decomposition of the core material of the insulating panel.

In some embodiments, the composite materials can comprise a single layer of the insulating material with one or more layers of additional materials (e.g., traditional insulation, etc.). In some embodiments, a plurality of layers of composite insulation materials comprising PCM(s) can be present, where each layer can be the same or different with regard to the type of composite insulation material (e.g., PCM(s) in a porous material, encapsulated PCM(s) in a material, PCM(s) in containers within the insulating layer, etc.), the type of PCM(s), and/or the dimensions of the layers. The use of a plurality of layers can allow for PCM(s) with different melting temperature or melting temperature ranges to be used from a hot side to a cold side, thereby providing a greater insulating capacity across the insulating system.

FIG. 7A-7E shows a number of embodiments of different arrangement of layers within an overall insulating system. Within FIGS. 7A-7E, reference will be made to a cold side being regulated on the left and a hot side on the right. Starting with FIG. 7A, a PCM or a PCM formulation (e.g., a mixture of two or more selected PCMs to achieve the a desired melting temperature range and latent heat of fusion) can be encapsulated within a container 702 with designed dimensions to form a composite insulation material, and then placed on the inner wall of an insulation material 704 to form an overall insulation system 700. The insulation material 704 can comprise any type of insulation such as a polyurethane foam, fiberglass, Styrofoam, cellulosic insulation, or the like. This demonstrates the use of a single layer of a container with PCM(s) along with an insulation material to form an insulating layer or system.

The container can form an enclosure into which the PCM(s) can be placed. The container can include any of the designs noted above including the use of PCM(s) in a porous material, encapsulated PCM(s) contained within the container, and/or a container filled with the PCM(s) without any additional components included. The container 702 can be made from a plastic, metal, or other material suitable for containing the PCM(s) while limiting or reducing leaking of the PCM(s) from the container 702. In some embodiments, the container can have an outside thickness of between about 0.25 inches and about 10 inches, or between about 0.5 inches and about 6 inches (depending on the insulation requirements and the thickness of the insulation wall). The length and width of the container can be selected to match the desired insulation layer or wall size. The selected PCM or PCM formulation can comprise any of those PCM(s) described herein. While shown as a rectilinear container, other shapes including the use of a plurality of pipes can also be used to contain the PCM(s) and form a layer in the insulation layer. The container with the PCM(s) can be bonded to the wall of the insulation material (e.g., using an adhesive, etc.) and/or placed in a bracket or other attachment device at the inner face of the insulation layer to form an insulation system.

As shown in FIG. 7A, the thickness of each of the container 702 and the insulation material 704 can be the same or different. For example, the insulation material can have an outside thickness of between about 0.1 inches and about 10 inches, or between about 0.25 inches and about 6 inches (depending on the insulation requirements and the thickness of the insulation wall). As also shown, the container can be arranged on an inside surface closest to the environment being regulated, and the insulation material 704 can be positioned closest to a hot environment. In some embodiments, the ordering of the layers can be reversed, and in such embodiments, the selection of the PCM(s) may be different to account for the expected temperatures on the hot side of the insulation layer.

FIG. 7B illustrates a system similar to that shown in FIG. 7A, and similar elements can be numbered the same. As shown in FIG. 7B, a container 702 with PCM(s) encapsulated therein can be disposed between two layers of insulation material 704. The container can be similar or the same as the container 702 as described with respect to FIG. 7A. Similarly, the insulation materials 704 can be the same or similar to the insulation materials as described with respect to FIG. 7A. In this embodiment, the container encapsulating the PCM(s) can be placed at the core of the insulation system to form a structure similar to a sandwich layup. In some embodiments, the container can be bonded (e.g., using an adhesive, etc.) to one or both of the insulation material 704 layers. In other embodiments, the three layers can be placed adjacent to each other and retained in position based on the installation within the insulation layer or system.

As shown in FIG. 7B, the container can have a thickness similar to that of the container 702 described with respect to FIG. 7A, and the individual thickness of the insulation materials 704 can be within the range described with respect to FIG. 7A. The individual thickness of the two insulation material layers can be the same or different. For example, the insulation material 704 layer closest to the environment being regulated can be the same, thicker than, or thinner than the insulation material 704 layer closest to the hot side, depending on the temperature requirement of the controlled environment.

FIG. 7C illustrates an embodiment in which a layer of a composite insulation material 706 formed form a porous material containing the PCM(s) can be contained between two layers of insulation material 704. In this embodiment, the composite insulation material 706 layers can be the same or similar to those described with respect to FIG. 7B, and the similar elements and dimensions will not be repeated for the sake of brevity.

As shown in FIG. 7C, the core material can comprise a porous material having the PCM(s) contained therein and formed into a panel type layer to form the composite insulation material 706. The composite insulation material 706 can include any of the porous materials as described herein with any of the PCM(s) described herein impregnated in the porous material. In some embodiments, the porous material forming the insulating layer 706 can be the same or similar to the insulation materials forming the insulation material 704 layers. This can allow the composition of the insulation material to be consistent across the cross section with the exception that the PCM(s) can be impregnated into a section of the insulation material between at least two outer sections that do not have the PCM(s) impregnated therein. The composite insulation material 706 can form a layer within the overall insulation system that can have a thickness between about 0.1 inches and about 10 inches, or between about 0.25 inches and about 6 inches, depending on the insulation wall size and insulation design.

In some embodiments, the composite insulation material 706 can have a film or foil covering the layer to help prevent leakage from the composite insulation material 706. The film or foil can include any of those described herein, and the layer can be adhered and/or heat sealed onto the composite insulation material 706. When a film is used, the coating of the film onto the composite insulation layer can be integrated into the fabrication of the composite insulation material 706. The composite insulation material 706 can then be bonded (e.g., using an adhesive or coupling mechanism, etc.) to the outer insulation material 704 layers and/or disposed in the insulation layer upon installation.

FIG. 7D illustrates an insulation layer having two layers containing the PCM(s) with one layer of insulation material 704 not having the PCM(s). The two layers can comprise a first layer 708 and a second layer 710. The first layer can comprise a container having encapsulated PCM(s) disposed therein. The second layer 710 can comprise a container having encapsulated PCM(s) disposed therein. While shown as including containers, the first layer 708 and/or the second layer 710 can also comprise a composite insulation material formed from a porous material having one or more PCM(s) impregnated therein and formed into an insulating layer.

The first layer 708 and the second layer 710 can comprise any of the composite materials as described herein, including any of the PCM(s) as described herein. The selection of the PCM(s) in each of the first layer 708 and the second layer 710 can vary. In some embodiments, a melting point or melting point range of the first layer 708 can be lower than the melting point or melting point range of the second layer 710. In some embodiments, the melting point of the second layer 710 can be between about 5 to about 20 degrees ° C. higher than the melting point of the first layer 708.

While shown as a first layer 708 and a second layer 710 in FIG. 7D, additional layers can be present. In some embodiments, three, four, five, or more composite insulation layers can be present. When multiple layers are present, the melting point or melting point ranges can generally be the lowest in the layers closest to the environment being regulated and increase towards the hot side of the insulation layer. For example, each adjacent layer in multi-layer assembly may have a melting point or melting point range increasing by about 1 to about 20 degrees ° C. as the layers approach the hot side of the insulation layer. Some amount of overlap in the melting point or melting point ranges may occur as the number of layers increases.

The thickness of the first layer 708 and the second layer 710 can vary between each layer, and the layers may generally have a thickness between about 0.1 inches and about 5 inches, or between about 0.5 inches and about 3 inches. As the number of layers increases, each individual layer may be thinner to allow the overall thickness of the insulation assembly to have a desired thickness for the insulation space available. Each layer can be bonded to the adjacent layers or the layers can each be placed in a bracket or otherwise affixed into position within the insulation assembly.

FIG. 7E illustrates an insulation system similar to that described with respect to FIG. 7D, and the similar components can be the same or similar to those described in FIG. 7E. As shown in FIG. 7E, two or more layers of composite insulation material can be present in the insulation system. At least a first layer 708 can be on a surface closest to the environment being regulated and at least a second layer 712 can be on a surface closest to the hot side of the insulation system. An insulation material 704 can be disposed between the first layer 708 and the second layer 712. Additional layers of composite insulation material can also be present in the insulation system between the first layer 708 and the second layer 712. For example, a total of 3, 4, 5, or more layers are possible in the insulation system as shown in FIG. 7E.

The first layer 708 can be the same or similar to the first layer 708 as described with respect to FIG. 7D. The second layer 712 can have the same structure and thicknesses as described with respect to the second layer 710 in FIG. 7D. The selection of the PCM(s) in the second layer 712 can provide PCM(s) having a melting point or melting point range at or below the expected ambient operating temperatures on the hot side, which is above the melting point or melting point range of the first layer 708. When multiple layers of composite insulation material are present, the melting point or melting point ranges can generally increase from the first layer 708 to the second layer 712. Each layer in the insulation assembly can be bonded to the adjacent layers or the layers can each be placed in a bracket or otherwise affixed into position within the insulation assembly.

In some embodiments, the insulated materials can be used for insulating cooled or refrigerated compartments. For example, any of the embodiments described with respect to FIGS. 7A-7E can be used for one or more insulation systems (e.g., walls, enclosures, etc.) within a cooler, refrigerator, or freezer. The selection of the PCM(s) can be made on the basis of the temperature being maintained within the cooler, refrigerator, or freezer and/or a location of the composite insulating material relative to the interior of the cooler, refrigerator, or freezer. For example, for freezer insulation, the PCMs as well as PCM formulations with a melting point of about −40 to about 0° C. can be used, and for cooler insulation, the PCMs as well as PCM formulations with a melting point of about −5 to about 10° C. can be used.

For example, for a −23° C. freezer insulation using a design as shown in FIG. 7A, a PCM with a melting temperature range of about −23 to about −15° C. could be used. Referring to Table 2, suitable PCM(s) can include a eutectic water-salt solution (22.4-23.3 wt. % NaCl solution) with a melting point of −21.2° C., PureTemp −21 (Biobased product; available from PureTemp LLC) with a melting temperature of −21° C., or another PCM with the similar melting temperature range. Similarly, for a 2° C. cooler using the design as shown in FIG. 7A, a PCM with a melting temperature range of 2-10° C. could be used. The PCM selection can include $LiClO_3 \cdot 3H_2O$ (melting temperature of 8.1° C.), Paraffin C14 (melting temperature of 4.5° C.), Formic acid (melting temperature of 8° C.) or any commercial PCM, such as RT 5 (Paraffin; available from Rubitherm GmbH) (melting temperature of 5° C.). Similar considerations can apply to the designs shown in FIGS. 7B-7D. In the design shown in FIG. 7D, for a freezer, the first layer 708 can have the melting point of about −21° C., while the second layer 710 can have a melting point that is the range of about −15 to about −2° C.

The insulating material can be formed in a number of ways. In general, the PCM(s) can be melted to form a liquid PCM, which can then be combined with the porous material to allow the PCM(s) to impregnate the pores of the porous materials. When the PCM(s) impregnate the porous material, the insulated material can be formed. A number of incorporation methods can be used to incorporate PCMs within the porous material including direct mixing of the liquid PCM(s) with the porous material, and/or immersion of the porous materials in a bath of molten PCM, macroencapsulated PCM(s), microencapsulated PCM(s), nano-encapsulated PCM(s), and/or shape-stabilized PCM(s).

For the impregnation method, the porous material can be obtained and prepared for impregnation. In some embodiments, the porous material can be optionally prepared by being ground or sized to have a desired size and/or shape. For example, the porous material such as a bio-based porous material can be ground to a desired size. The size of the porous material may be selected to allow for the formation of the insulating material into a desired shape when impregnated with the PCM(s).

Further, various treatments can be used to prepare the porous material. For bio-based materials, a chemical treatment such as treatment with a weak base (e.g., 5% NaOH) can be used to remove some of the lignin and provide a greater pore volume of the biomass material. Other chemical treatments may also be used to modify the surface properties of the pores to allow the PCM(s) and any optional binders to impregnate and bond to the porous materials.

Once the porous materials are prepared, the PCM(s) can be selected and blended if more than one PCM is being used. When a binder is present, the binder can be combined with the PCM(s) to form a mixture having any of the binders and weight percentages as described herein. When a flame retardant is used, it can be combined with the mixture or applied after the porous material is impregnated.

The PCM(s) and optional binder can then be contacted with the porous material. In order to retain the PCM(s) in the liquid phase, a reactor can be used that is heated during the impregnation process. The temperature can be maintained above the melting point or range of the PCM(s). For example, the temperature within the reactor can be maintained at least 2-5° C. above the melting point of the PCM(s). In some embodiments, the temperature of the reactor can be maintained between about 30° C. to about 80° C. during the impregnation process. In some embodiments, pressure can also be applied to drive the PCM(s) into the pores of the porous material. The pressure can be at least about 50 psia, at least about 75 psia, or at least about 100 psia. The impregnation process can continue for about 10 minutes to about 10 hours, or for about 10 minutes to one hour. When a binder is present, the reaction time may be based on the reaction time of the binder to allow the binder to fully cure prior to releasing the pressure or lowering the temperature.

In some embodiments, the desired amount of the PCM(s) can be combined in the liquid phase with the porous material. This can be referred to as the direct mixing method. The reaction may continue along with mixing of the porous material until the PCM(s) are fully absorbed and impregnated into the porous material. Other processes can comprise using an excess of the PCM material and immersing the porous material in the molten PCM(s). After a desired time, excess PCM(s) can be removed at elevated temperature from the reactor to leave the porous material having the desired amount of PCM(s) impregnated therein. The reaction conditions (e.g., temperature, time, pressure, etc.) can be controlled to allow for a desired amount of the PCM(s) to be absorbed and impregnate into the porous material in the immersion method.

Once reacted, the resulting insulating material can be formed into a desired structure. In some embodiments, the insulating material can be formed in a planar layer by providing the impregnated porous material to a mold. A press can be used to form the layer within the mold prior to the removal of the insulating layer. When used to form an insulating structure, one or more additional insulating materials can be layered with the insulating material and pressed to form the final structure.

When a film is used with the insulating materials, the film can be used on one or more surfaces of the resulting insulating layer after it is removed from the mold. For example, a film can be applied to both sides of the insulating layer, and in some embodiments the edges can be sealed. Heat an optionally be applied to allow the film to melt into the insulating material to enclose the insulating material and prevent leakage of the PCM(s) during use. In some embodiments, the optional flame retardant can be applied after the film is applied to the insulating layer. Flame tests can be conducted in accordance with the procedure described in ASTM D6413 (e.g., the latest version as of the filing of this application) on the insulated material to evaluate the fire resistant properties.

The process as described above is illustrated in FIGS. 8A-8C for the impregnation of a porous material comprising processed wood with a PCM comprising paraffin wax. As shown in FIG. 8A, a woody core can be prepared by being ground to a desired size, and the PCM can be provided in a solid phase. The process described herein can then be used to melt the paraffin wax and impregnate the woody core with the melted paraffin. The resulting material is shown in FIG. 8B. The resulting material can then be used in a mold to form a final layer as shown in FIG. 8C. This fabrication process is possible for large-scale manufacture. Multiple large-scale 2 feet (Width)×4 feet (Length)×3 inch (thickness) SIP panels can be fabricated and delivered based on the above impregnation process.

During the impregnation process, the properties of the porous material can be matched to those of the PCM(s) to obtain better infiltration and impregnation. For example, the hydrophobic/hydrophilic properties of the PCM(s) can be matched to those of the porous material to obtain better impregnation of the PCM(s) by matching the wetting properties. If the properties are not matched, an optional pre-processing step can be carried out on the porous material to modify the hydrophobic/hydrophilic properties to better match the properties of the PCM(s). By improving the impregnation, the thermal properties of the resulting composite insulation materials can be improved.

In addition to the direct mixing and immersion processes, other impregnation methods can also be used. Another incorporation method can include embedding macro-encapsulated, microencapsulated or nano-encapsulated PCMs in porous materials such as building materials. In these embodiments, the PCM(s) can be provided in an encapsulated form and combined with the materials used to for the porous materials. For example, encapsulated or shape stabilized PCM(s) can be combined with concrete, gypsum, polymers, foams (e.g., polyurethane foams, etc.), or other materials that can be processed to form panels or other insulating or structural materials. The encapsulated PCM(s) can then function to store heat within the encapsulations within the resulting insulating materials. The encapsulation can serve to prevent leakage of the PCM(s) during use. Such methods may increase the insulating values or standard building materials.

In some embodiments, the encapsulation may comprise macroencapsulation such as storing the PCM(s) in storage structures such as containers or pipes. In this embodiment, the PCM(s) can be melted and used to fill a storage structure. Storage structures within the containers or pipes can be present. For example, honeycomb shaped pores or other porous structures can be within the containers to help to retain the PCM(s) in position when in a liquid phase. When pipes are used, the pipes can be formed from a thermally conductive material such as a metal (e.g., copper, steel, etc.). Once filled, the storage structure can be sealed to encapsulate the PCM(s). The resulting storage structures can then be embedded within SIPs to form a PCM based insulating system according to any of the embodiments disclosed herein (e.g., as a stand-alone layer, as a layer in an insulation system, etc.). This formation method may providing for a sealed PCM that can have a relatively large weight loading of the PCM material. The storage structures can be aligned with a desired density within the SIP to provide a layer having the encapsulated PCM(s) within a wall or other insulating structure.

Once formed, the composite insulation material or materials can be used to insulate a regulated environment from an external environment. During the insulation process, a hot side of an insulation layer, which can comprise a composite insulation material, can transfer heat through the insulation layer to a cold side. During the insulation process, one or more solid phase PCMs within the composite insulation material can be melted in response to the transfer of heat through the insulation layer. The phase change from a solid phase to a liquid phase can occur at a specific melting point temperature and/or over a melting point range. The effect of the phase change can be to absorb or store energy at a temperature defined by the melting point or melting point range. During the phase change process, the result can include a reduced transmission of heat through the insulation layer as it is absorbed by the phase change of the PCM(s). The PCM(s) in the insulation layer can include any of those described herein and at least one layer in the insulation layer can comprise any of the composite insulation materials as described herein.

The heat passing through the insulation layer may eventually melt all of the PCM(s) in the insulation layer, at which time the heat can pass into the regulated environment to warm the environment. The environment can then be regulated by a cooling system to cool the environment. During this process, the reverse process can occur as more heat is withdrawn from the environment than can transfer through the insulation layer. The temperature of the PCM(s) may then be reduced below the melting point or melting point range of the PCM(s), and any liquid phase PCM(s) can solidify at the melting point or melting point range. The process can occur during the cooling cycle, which can allow the cooling system (e.g., a compressor driven air conditioner, refrigerator, or freezer system) to run until the heat has been withdrawn from the PCM(s) within the insulation layer. This may allow the cooling system to operate more efficiently as the cycle time can be extended to provide fewer start/stop cycles.

It can be noted that the same process can occur with a heated environment where the cold side of the insulation layer can be considered the exterior of the regulated environment. In this process, the PCM(s) can start in the liquid phase and gradually solidify as the heat transfers from the regulated environment to the cooler external environment. Once fully solidified, a heat source can be used to reheat the regulated environment and melt the PCM(s) at a nearly constant temperature. This can allow the heat to be used less frequently based on the solidification process releasing heat into the environment.

Figure 9:
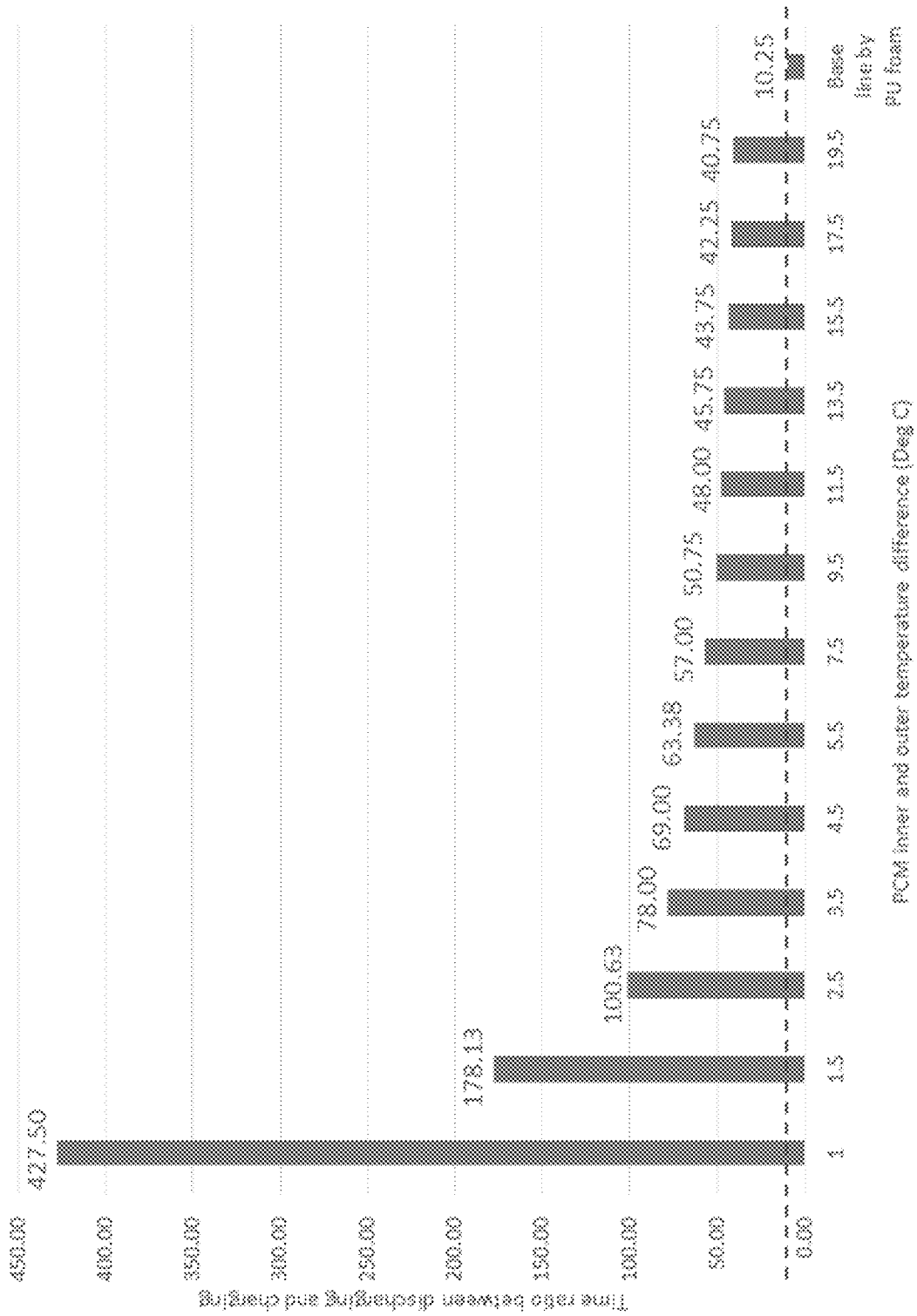
FIG. 9 is a graph illustrating the time ratio between discharging and charging for 1-inch thickness composite insulation material vs. 6-inch PU foam (the base line).

The use of the composite insulation materials in an insulation system can help to provide additional insulation value as well as making environmental control systems more efficient. An example of such efficiency can be provided by an improvement in the running time of a cooling or refrigeration system within a space being cooled. It is expected that the use of the PCM(s) in the composite insulation material can significantly improve the cooling system efficiency. FIG. 9 is a graph illustrating the time ratio between discharging and charging for an insulation comprising a 1-inch thick PCM layer versus a 6-inch thick PU foam (the base line). As used in this example, charging refers to the continuous running time of a compressor in the cooling system, while discharging refers to the time when the compressor is not running. For the base line case, the outer environmental temperature is the room temperature of 25° C. For PCM layer, the outer temperature is shown as increasing in temperature difference along the graph between 1° C. to 19.5° C. higher than the cooler/freezer compartment temperature. FIG. 9 displays heat transfer simulation results of the discharging and charging time comparisons when only a single layer of the composite insulation material comprising the PCM having a 1-inch thickness is used as the insulation for the freezer. As shown in FIG. 9, as the temperature difference between the inner and outer side of the composite insulation layer is lowered, the energy savings can be increased based on the time ratio between discharging and charging (wherein the time ratio refers to the discharging time/charging time). A larger ratio indicates the electricity consumption from the compressor is lowered and more efficient. With around a 19° C. temperature difference, the time ratio is approximately four times higher than that of the base line, leading to a significantly increased energy savings for the cooler/freezer.

Figure 10:
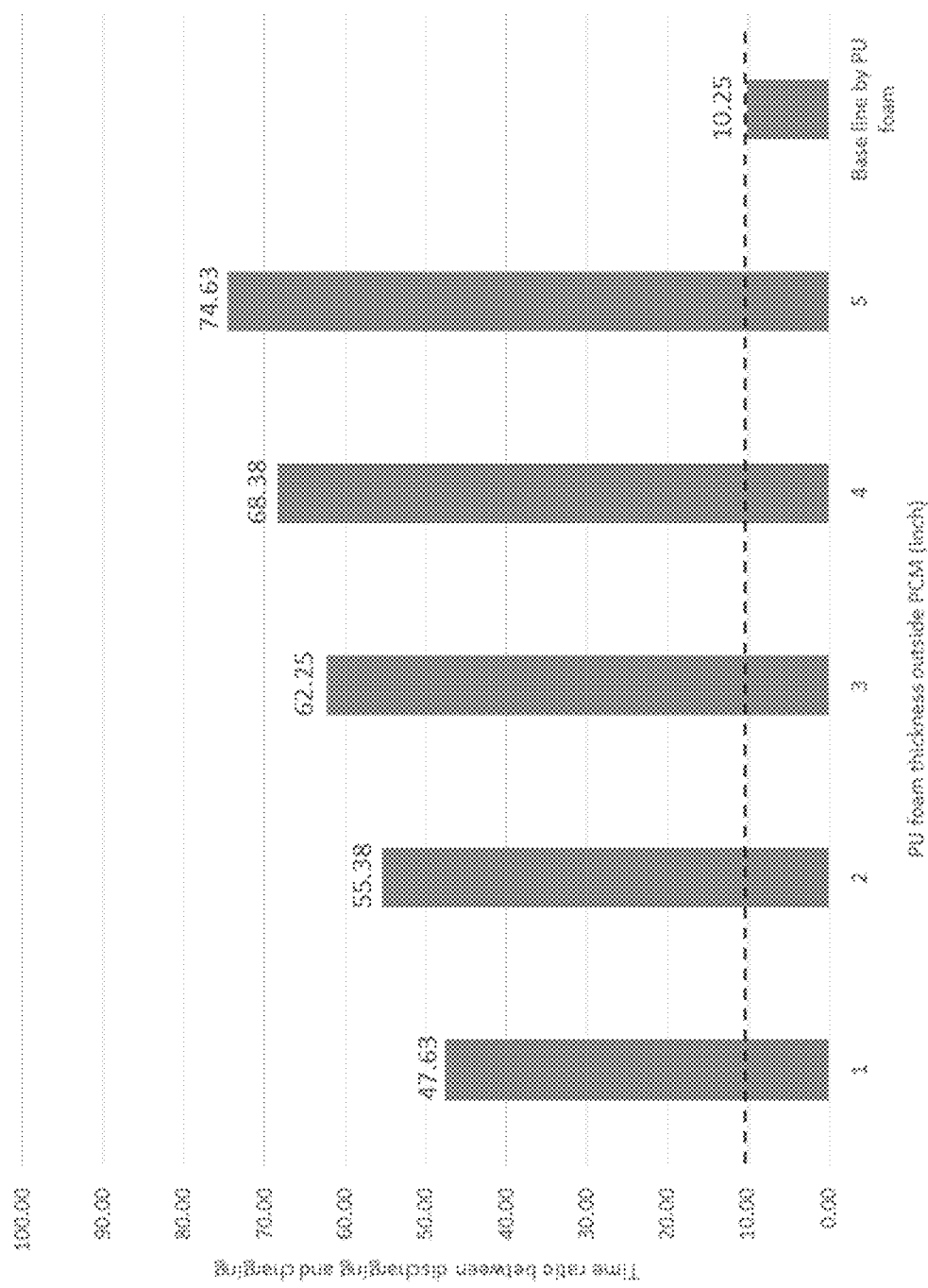
FIG. 10 is a graph illustrating a comparison of time ratio between discharging and charging for various thicknesses of PU foam outside the 1-inch composite insulation material layer

A similar scenario further illustrates the improvements of the use of the composite insulation material. As shown in FIG. 10, a graph illustrating a comparison of the time ratio between discharging and charging for various thicknesses of PU foam outside of a 1-inch thick layer of a composite insulation material comprising a PCM. As shown, as the thickness of the layer of the PU foam increases, the energy savings can also increase, and as compared to the baseline of using PU foam alone, the energy efficiency can demonstrate significant improvements. With the usage of the composite insulation material, the thickness of the PU layer needed can also be decreased. For the case of a 1-inch thick PU foam outside of the 1-inch composite insulation material layer, the time ratio between discharging and charging (e.g., as indicative of the energy savings) is approximately four times higher than that of the base line.

In some embodiments, it is expected that a life cycle analysis of the use of the composite insulation materials comprising PCM(s) as described herein can have an improved energy efficiency in the range of 5% to 300% (using the criteria described in Example 7) as compared to synthetic fiber insulation materials without the PCM(s). In some embodiments, the improved energy efficiency may include a range from 5%-8%, from 5%-20%, from 5%-50%, from 20%-75%, from 50%-150%, from at least 5%, from at least 10%, and from at least 20% energy efficiency. Compared to the synthetic fiber insulation materials, the composite insulation materials comprising the PCM(s) can present advantages for the environmental and cost benefits of the insulation.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

Building Energy Modeling and Cost Analysis

The effect of PCM(s) on building energy savings can be numerically predicted using modeling methods for PCM-integrated building simulations, and specifically the heat capacity method, which is able to be integrated into prevalent building simulation programs, such as EnergyPlus, TRNSYS, and the like.

The EnergyPlus program (available from U.S. Department of Energy (DOE)) can be used for PCM-impregnated cell, cabin, or house prediction. The EnergyPlus program combined with the model of the composite insulation materials may be verified and validated through analytical method and experimental measurements. The models and methods can show that the use of PCM-based wallboards (e.g., the composite insulation materials as described herein) can improve the thermal inertia of buildings and reduce indoor temperature fluctuations up to 4° C. in a cabin on a typical summer day. These models and methods can also show that installation of the PCM based materials has a positive effect on thermal comfort and reduces the annual overheated hours from about 400 to 200 in a two-story apartment house.

In another model, a prototype house and its HVAC system may be modeled and simulated in the TRNSYS environment. TRNSYS is a transient system simulation tool for a variety of applications, including building simulation, energy system research, etc. The simulation reveals that with the proper selection of PCM based materials based on the melting point, it could achieve a substantial reduction in the total cooling demand up to 85% compared to a prototype house without the embedded PCM based materials. Additional TRNSYS type models simulate the thermal behavior of a cell with PCM-integrated wall structure.

Besides the building energy simulation programs, there are other methods to simulate the heat transfer performance of building wall structures, leading to the evaluation of the potential building energy savings. One example contemplated for use herein is the finite volume method, which solves the one-dimensional, transient heat conduction equation through a multi-layered PCM enhanced wall using the typical meteorological year (TMY3) data for the exterior boundary condition. The numerical simulation results demonstrated that the PCM composite wallboard could reduce the energy consumption and shift the peak electricity load in summer. Cost analysis for PCM-enhanced building envelopes in southern U.S. climates can estimate a payback period of ~5-10 years for PCM-enhanced gypsum board applications in the buildings in Phoenix, Ariz. based on the PCM prices≤$3.50/lb.

Example 2

PCM Incorporated in Biodegradable Materials

The use of paraffin wax (PCM) infiltrated into pine wood and woody core from kenaf through an immersion process was studied. The thermal properties (i.e., thermal conductivity, specific heat, latent heat of fusion, etc.) of the PCM treated biomass were characterized. It revealed that the woody core had a better infiltration rate with paraffin wax than wood due to the same hydrophobic property of natural plant material cellulose and wax. Hence, the latent heat capacity of woody core-PCM composite during the phase change process was approximately two times higher than that of wood-PCM composite based on the Differential Scanning calorimetry (DSC) measurements.

Example 3

Figures 11A, 11B:
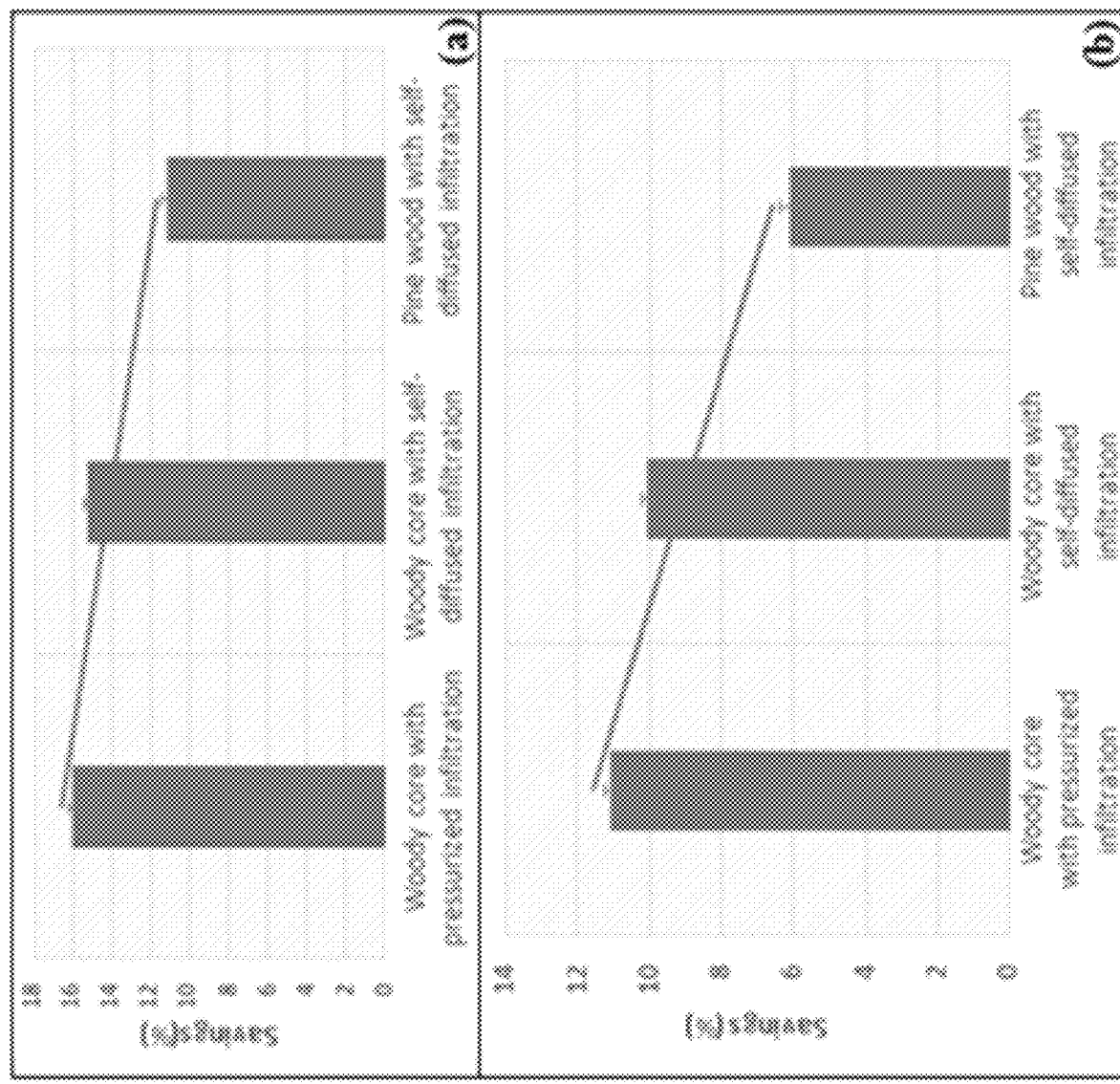
FIGS. 11A and 11B are illustrations showing that a composite insulation material has the potential to save annual heating load by up to 16% and annual cooling power by up to 11% when applying the woody core-PCM composite to the ZOE research lab according to some embodiments.

Referring to FIGS. 11A-11B, preliminary building energy simulations were performed on a lab building using the EnergyPlus simulation tool. The above PCM-enhanced composites from Example 2 were applied in the roof and one side of the wall structure of the lab in the simulation model. Through the simulations, the PCM was able to save annual heating load by up to 16% and annual cooling power by up to 11% when applying the woody core-PCM composite to the lab structure, as displayed in FIGS. 11A-11B. The energy savings were less when using the wood-PCM composite due to the lower infiltration rate in woods. Through the experimental and numerical studies, it preliminarily demonstrated the wetting theory for the PCM and porous matrix such that the two materials should have the same or similar hydrophobic/hydrophilic properties to achieve better infiltration rate and higher thermal heat capacity.

Figure 12:
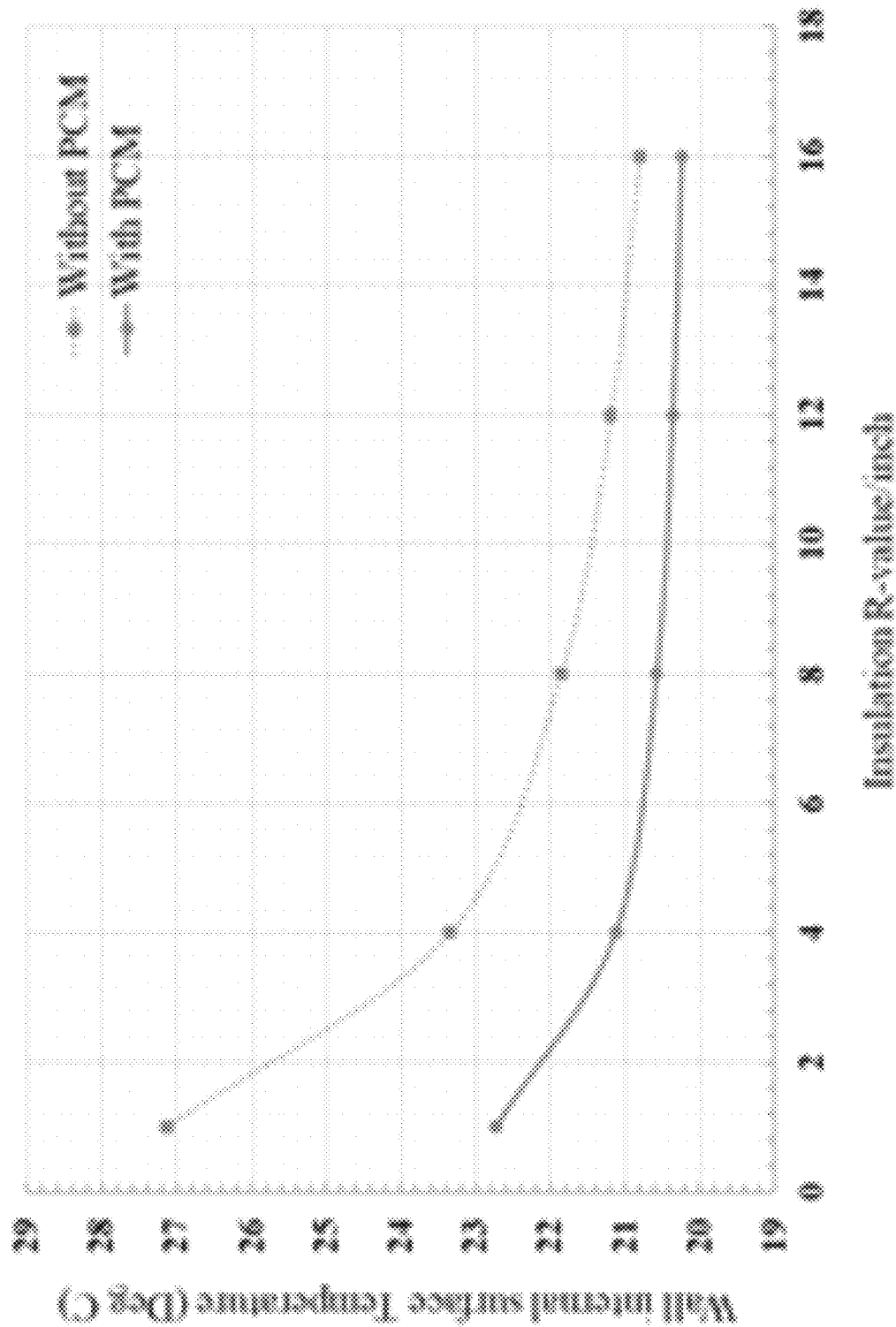
FIG. 12 is an illustration of a wall internal surface temperature with respect to various R-values of the insulation with/without PCM(s) embedded according to some embodiments.

Referring to FIG. 12, the wall internal surface temperature is shown with respect to various R-values of the insulation with/without PCM embedded. Moreover, heat transfer simulations were conducted for a one-inch thick SIP in the summer weather condition through the commercial software COMSOL Multiphysics (available from COMSOL Multiphysics®). The outside temperature was 37° C. (98.6° F.: typical summer temperature in southern U.S.). From the simulation results shown in FIG. 12, it is noted that the insulation R-value of 3 with infiltrated PCM could achieve the same indoor condition (based on the wall internal surface temperature) as that of a material having an R-value of 10 without the PCM. It proves that the PCM has the potential to improve the "effective" R-value above 10 without significantly increasing the instinctive ("actual") R-value (e.g., by maintaining around R-3/inch thickness). The effect of infiltrated PCM on the porous biodegradable material instinctive R-value is reduced when the pore size is small.

Example 4

Measurement Equipment and Manufacturing Capabilities

A self-contained 1,200-ft² building facility with sub-metering capabilities for validation and simulation of whole building system performance is shown. Operating components include solar panels, solar water heating, wind turbine, geothermal heat pumps, underfloor radiant heating and cooling, solar chimney, rainwater harvesting, a water purifier system, etc. The lab provides a carefully controlled environment to conduct research projects on building energy savings as well as building energy harvests by various renewable energy sources (i.e., solar, wind, geothermal, etc.).

A pilot scale bioproducts manufacturing lab was also constructed. This lab has a pilot scale compression molding processing line for both mat forming and the lamination processes. It also has two extrusion systems, which are able to extrude samples both in large and small scales. Vacuum assist resin transfer molding process, reactor for nanoparticle synthesis, sonication system for nanoparticle dispersion, box and tube vacuum furnaces for high temperature processing, etc. have been implemented in the bioproduct manufacturing laboratory.

Example 5

In yet another non-limiting example, the use of biomass (woody core from kenaf or hemp) for building envelope insulation materials is demonstrated to reduce the costs and the negative impact on the environment. Woody core and the PCM employed (paraffin wax) are both hydrophobic, and are compatible with each other. The system used a small amount of resin with the PCMs and a soy based thin film to enclose the PCM impregnated woody core to address the issue of PCM leaching at elevated temperature. The simulation approach provides the relationship between the building energy savings and "effective" R-value of the insulation materials.

The thermal properties for the composite materials include the thermal conductivity, specific heat, latent heat of fusion, and degree of PCM filling for a small amount of composite materials. The thermal conductivity is analyzed at a Hot Disk Thermal Constants Analyzer for both infiltrated and non-infiltrated samples. The sample size for the hot disk analyzer was around 2" (Width)×2" (Length)×1" (Thickness). The hot disk analyzer uses the transient heat conduction method to characterize the directional thermal conductivities of samples. The specific heat and latent heat of fusion of the PCM infiltrated composites is measured using the differential scanning calorimetry (DSC) instrument. The amount of sample required for the DSC measurement is only ~5 mg. Moreover, the open porosities of the biodegradable sample before and after the infiltration were measured by a Pycnometer through gas penetration, and therefore, to determine the degree of filling of PCM in the porous medium. Multiple samples were collected from the same panel for the open porosity measurement to validate whether the infiltration was uniformly distributed in the panel or not.

Figure 13:
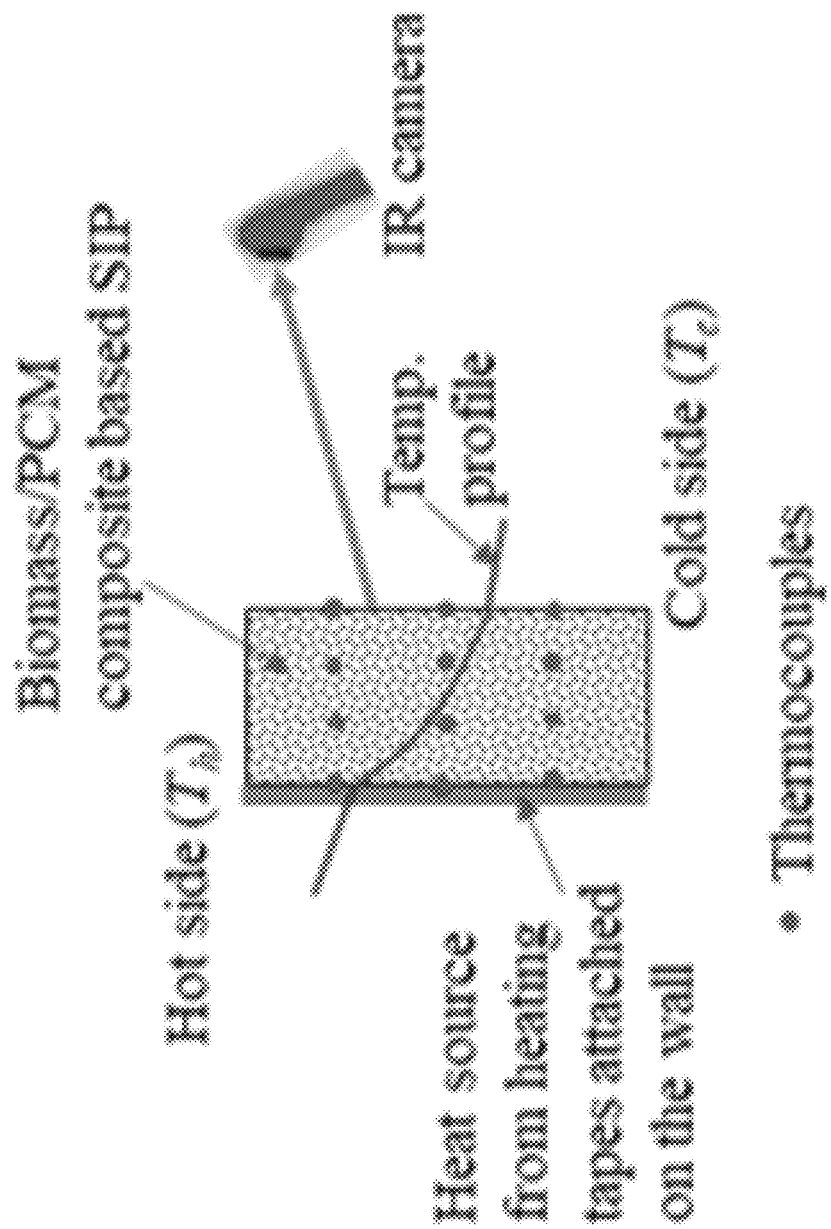
FIG. 13 is an illustration of a non-limiting example showing of the heat transfer test section for the structure insulation panel.

FIG. 13. is a sketch of the heat transfer test section for the SIP. The thermal conductivities of the porous biodegradable material before and after infiltration are not expected to have a remarkable difference. The PCM may or may not significantly affect the instinctive thermal conductivity of the bio-product. Moreover, the PCM may or may not be uniformly distributed in the porous medium, and the corresponding latent heat of fusion of the PCM-enhanced composite is expected to be more than 65% of the pure PCM latent heat based on the optimum infiltration process.

Large-scale characterization was conducted for the fabricated woody core/PCM composite panel to demonstrate the composite thermal properties in large-scale panel. The transient heat conduction approach was applied to the panel to verify the thermal properties in the bulk panel structure. FIG. 13 shows the sketch of the heat transfer test section. The temperatures at various locations and surface of the panel were measured by the embedded thermocouples and infrared (IR) camera during the heating process. The measurement data was compared with the numerical simulation results for the test section. Through matching the temperature profiles, the actual thermal properties of the panel were obtained.

For the expected results, the thermal properties, e.g., thermal conductivity (related to "actual" R-values), specific heat and latent heat of fusion (related to "effective" R-values), for the large-scale composite-based panel were determined, which provides the information for the building energy saving simulations. Moreover, the properties from large-scale characterization were expected to be close to those obtained from the small-scale samples.

Modeling and simulations were used to predict the building energy savings by using the woody core biomass/PCM composite insulation. The building energy savings may be calculated through building energy modeling. The EnergyPlus program can be used to predict the potential energy savings in the aforementioned lab example when replacing one side of the wall with the fabricated PCM-enhanced biomass based SIP. The lab example was designed into three zones in the EnergyPlus model: Mechanical Room, Electrical Room, and Conditioned Zone. The program can be set up to provide the heating and cooling load output for each zone in the building. The occupant schedule, wall constructions, material properties, and building location were input in the model. Furthermore, the temperature and airflow distributions in the lab example can be simulated through commercial software ANSYS Fluent (available from ANSYS®) or COMSOL Multiphysics (available from COMSOL Multiphysics®).

The building energy savings as well as building temperature and airflow distributions are obtained and the annual lab example building heating and cooling power consumptions have a range of up to 30-40% when using the optimized biodegradable material/PCM SIP in the wall structure. Moreover, the location of PCM in the wall structure is also important.

Example 6

Correlation to Calculate "Effective" R-Value for PCM-Enhanced Insulation

Through the thermal properties characterization, numerical simulations, and building energy modeling, metrics were developed to study the parametric effects on the building energy savings and "effective" R-values. Table 3 displays the variations of building energy savings with respect to the pore size and open porosity, PCM degree of filling, thermal conductivity, specific heat and latent heat of fusion of composite, the positions of woody core-PCM composite based SIP in the building envelope, and building wall inner and outer surface temperatures. The "actual" R-value ($R_{act}$) of the SIP is calculated based on its thermal conductivity:

$R_{act}$=thickness of SIP/apparent thermal conductivity   Eq. (1)

The "effective" R is evaluated based on the building energy savings and wall inner surface temperatures. The thermal inertia takes the latent heat of fusion into consideration. The "effective" R-value is determined by the "actual" R-value of non-PCM SIP under the same energy saving and wall inner surface temperature situation. The "effective" R-value is expected to be higher than the "actual" R-value of the material to include the latent heat effect.

porosity, PCM degree of filling, and the "actual" R-value of the biodegradable insulation. The "effective" R-value of the PCM-enhanced biodegradable insulation is expected to achieve a value of greater than or equal to 10 per inch-thickness.

The fabricated SIP is integrated in the wall structure of the lab to experimentally test the effect of woody core/PCM composite based SIPs on overall building energy savings. The energy consumptions of various devices and equipment in the lab is collected daily. The lab separates the electricity readings for different types of electricity consumption devices, including the HVAC system, lighting, solar control panel, etc. with the focus on the HVAC system energy savings. Furthermore, the lab includes sub-metering capabilities to demonstrate the performance of the building system. Multiple thermal sensors and airflow meters are placed at different elevations in the lab to get the whole temperature distribution and airflow field. The collected HVAC electricity consumptions, measured lab temperature and airflow fields are compared with the simulation results to validate.

The purpose of the field-testing is to verify the building energy modeling, the evaluated "effective" R-values for the woody core/PCM composite based SIP in the previous task, and demonstrate the feasibility of the proposed PCM-enhanced biodegradable insulation for building application.

The comparison metrics for the experimental measurements and simulation results (shown in Table 4) are generated to demonstrate the prediction models and correlations developed in the previous examples. Both PCM-enhanced and non-PCM biodegradable insulations are experimentally tested in the lab building envelope to demonstrate the energy savings by the PCM. The simulation results expect within ±15% variation of the measurement data under the same situation. Three to five panels are fabricated and tested for each case (e.g., insulations with/without PCM embedded) to obtain more reliable measurement data. It is expected that above 90% of the tests are within ±15% variation of the simulation result. Through the numerical and experimental investigations, the degree of building energy savings using

TABLE 3

Metrics for the development of "effective" R-value for PCM-embedded SIP. (Metrics 1)

| | Pore size and open porosity | PCM degree of filling* | Thermal properties | Position of PCM-enhanced SIP | Wall inner surface temp. | Energy consum. | "actual" R-value | "effective" R-value |
|---|---|---|---|---|---|---|---|---|
| Non-PCM SIP* | $A_1$ | — | $C_1$ (No latent heat) | $D_1$ | $E_1$ | $F_1$ | $R_{act-1}$ | — |
| SIP with PCM | $A_2 < A_1$ | ≥65% | $C_2$ (latent heat of fusion) | $D_2 = D_1$ | $E_2 < E_1$ | $F_2 < F_1$ (reduced by 30-40%)& | $R_{act-2} \approx R_{act-1}$ | $R_{eff-2} \geq R_{act-2}$ (i.e., $R_{eff-2} \geq$ 10 per inch) |

*The control group
*PCM degree of filling (%)=
&The annual ZØE lab energy consumptions are expected to be reduced by up to 30-40% when using PCM in SIP.

The "effective" R-values for PCM-embedded panels is calculated according to a correlation described by the function of a series of parameters, including pore size and open biomass/PCM composite insulation can be quantitatively determined based on the building size, local weather conditions, and PCM thermal properties.

TABLE 4

Comparison metrics for the experimental measurements and simulation results of the ZØE lab performances. (Metrics 2)

| | | Building temperature distribution | Building airflow field | Energy consumptions of the HVAC system | R-value* |
|---|---|---|---|---|---|
| Experimental measurements | Insulation without PCM | $T_{1-1}$ | $V_{1-1}$ | $E_{1-1}$ | $R_{1-1}$ |
| | PCM-enhanced insulation | $T_{1-2}$ | $V_{1-2}$ | $E_{1-2} < E_{1-1}$ | $R_{1-2} \approx R_{1-1}$ |
| Simulation results | Insulation without PCM | $T_{2-1}$ | $V_{2-1}$ | $E_{2-1}$ | $R_{2-1}$ |
| | PCM-enhanced insulation | $T_{2-2}$ | $V_{2-2}$ | $E_{2-2} < E_{2-1}$ | $R_{2-2}$ ($\geq 10$ per inch) |

*$R_{1-1}$, $R_{1-2}$ and $R_{2-1}$ are the "actual" R-values of the insulation. $R_{1-2}$ is expected to be close to the value of $R_{1-1}$ to demonstrate that the infiltrated PCM will not significantly alter the instinctive R-value of biodegradable insulation. $R_{2-2}$ is the "effective" R-value input in the building energy modeling to simulate the phase changing effect; $R_{2-2}$ is expected to be higher than the other three "actual" values to match with the reduced energy consumption results ($E_{2-2}$).

Example 7

Life Cycle Analyses for the SIP Wall from Woody Core Biomass/PCM Composite Insulation Life Cycle Analysis (LCA) may include three components: life cycle cumulative energy demand assessment (LC-CED) focusing on the total energy demand in life cycle; LCA on environmental impacts, and life cycle costing (LCC) on economic impacts. The LCA framework methodology provided by the International standard organization (ISO) 14040 (ISO 2006) is utilized to assess comprehensive impacts of LCA, LCC and LC-CED for the proposed PMC impregnation process. The commercial SimaPro 8.2.3 software is used for the evaluation.

The system boundaries considered in the project consists of PCM treatment process. The LCA system boundary including the basic LCA material. The input items for LCA are energy, materials, machinery and labor; while the output includes energy consumed, which will be the system boundary under consideration. The "cradle-to-grave impacts" function is used, which means that the system boundary is considered when the cellulose is received from the treatment system, in the pressure reactor, processed into insulation, used in building construction, and ends with the disposal. The functional unit of proposed project is one 200 square foot house with working life of 50 years.

For a wide assessment of environmental impact, the Building for Environmental and Economic Sustainability impact set and Eco-indicator 99 (burden on environment) may be used. Three types of environmental damages may be considered: Human health, Ecosystem quality, and Resource depletion. These damages are quantified by damage models. The BEES technology has a recognized and accepted methodology to ensure a level playing field. The global warming potential (GWP) used by BEES was developed in 2001 by the International Panel on climate change.

The data collection is performed during the operation of the system for repetitive times. The operational inputs and quantity of insulation may be measured at different times of the year. The data to be collected include:

Data for LCA: GHG emissions: quantities of all materials and corresponding life cycle inventory data. The life cycle inventory data will be obtained from existing software packages (SimaPro) or open database (such as US LCI database).

Data for LCC: Economic present values: material costs, maintenance and retrofitting costs and residual values of envelope materials. R.S. Means may be used for most of the material costs, as well as maintenance and retrofitting costs. Surveys will be performed to collected additional costs for all costs and residual values of the selected materials.

Data for LC-CED: Total energy demand data related to life cycle.

The LCA results show that the SIP wall from the biomass/PCM composite insulation provides a significant contribution to the energy efficiency of the building construction, where significant may range from 5% to 300% improved energy efficiency compared to synthetic fiber insulation materials. In addition, the improved energy efficiency may include a range from 5%-8%, from 5%-20%, from 5%-50%, from 20%-75%, from 50%-150%, from at least 5%, from at least 10%, and from at least 20% energy efficiency. Compared to the synthetic fiber insulation materials, the woody core biomass/PCM presents advantage for the environmental and cost benefit.

Having described various systems and methods herein, certain embodiments can include, but are not limited to:

In a first embodiment, an insulated material comprises: an porous material, wherein the porous material comprises a plurality of pores; and a phase change material disposed within the plurality of pores in the porous material.

A second embodiment can include the insulated material of the first embodiment, further comprising: a binder, wherein the binder is mixed with the phase change material within the plurality of pores.

A third embodiment can include the insulated material of the second embodiment, wherein the binder comprises a material selected from the group consisting of: epoxy resin, phenoxy resin, alkyd resin, acrylic resin, vinyl resin, polyester resin, polyurethane resin, Vinyl acetate/ethylene copolymer emulsion, high solids epoxy, amine-cured epoxy, water-based latex, two-part epoxy, and mixtures thereof.

A fourth embodiment can include the insulated material of any one of the first to third embodiments, further comprising: a thin film disposed on at least one outside surface of the porous material.

A fifth embodiment can include the insulated material of any one of the first to fourth embodiments, wherein the porous material comprises a material selected from the group consisting of: a porous biomass, a porous polymer, a porous lignocellulosic fiber, a porous polyurethane foam, a porous expanded polystyrene, a porous air-entrained concrete, a porous rock wool, a porous polyisocyanurate material, a porous natural plant material, a partially delignified lignocellulosic biomass, and combinations thereof.

A sixth embodiment can include the insulated material of any one of the first to fifth embodiments, wherein the phase change material comprises a material selected from the group consisting of: 1-dodecanol, n-octadecane, polyethylene glycol 900, 1-tetradecanol, medicinal paraffin, a paraffin wax, paraffin RT60/RT58, biphenyl, $CaCl_2.6H_2O$, $Na_2SO_4.10H_2O$, $Na_2CO_3.10H_2O$, capric acid, lauric acid, myristic acid, palmitic acid, stearic acid, and combinations thereof.

A seventh embodiment can include the insulated material of any one of the first to fifth embodiments, wherein the phase change material comprises a material selected from the group consisting of: $LiClO_3.3H_2O$, $ZnCl_2.3H_2O$, a eutectic water-salt solution: 22.4-23.3 wt. % NaCl solution, Paraffin C14, Paraffin C15-C16, Polyglycol E400, Formic acid, propyl pamiate, isopropyl pamiate, a salt solution, and combinations thereof.

An eighth embodiment can include the insulated material of any one of the first to seventh embodiments, further comprising: one or more insulated panels, wherein the porous material is disposed on a surface of the one or more insulated panels.

A ninth embodiment can include the insulated material of any one of the first to eighth embodiments, wherein a mass ratio of the phase change material to the porous material is between 10:1 to 1:10.

A tenth embodiment can include the insulated material of any one of the first to ninth embodiments, wherein the phase change material is encapsulated in an encapsulant, and wherein the phase change material is disposed in the plurality of pores in the encapsulant.

An eleventh embodiment can include the insulated material of any one of the first to tenth embodiments, further comprising: a flame retardant, wherein the flame retardant is disposed on the porous material.

In a twelfth embodiment, an insulation system comprises: a container; and a phase change material disposed within the container.

A thirteenth embodiment can include the insulation system of the twelfth embodiment, wherein the container has a rectilinear configuration having a thickness in a range of 0.25 inches to 10 inches.

A fourteenth embodiment can include the insulation system of the twelfth embodiment, wherein the container comprises a plurality of pipes, wherein the phase change material is disposed in the plurality of pipes.

A fifteenth embodiment can include the insulation system of the fourteenth embodiment, wherein the plurality of pipes are arranged in a row.

A sixteenth embodiment can include the insulation system of any one of the twelfth to fifteenth embodiments, further comprising: one or more insulation layers, wherein the one or more insulation layers are coupled to the container.

A seventeenth embodiment can include the insulation system of any one of the twelfth to sixteenth embodiments, further comprising: a thin film disposed on at least one outside surface of the porous material.

An eighteenth embodiment can include the insulation system of any one of the twelfth to seventeenth embodiments, wherein the porous material comprises a material selected from the group consisting of: a porous biomass, a porous polymer, a porous lignocellulosic fiber, a porous polyurethane foam, a porous expanded polystyrene, a porous air-entrained concrete, a porous rock wool, a porous polyisocyanurate material, a porous natural plant material, a partially delignified lignocellulosic biomass, and combinations thereof.

A nineteenth embodiment can include the insulation system of any one of the twelfth to seventeenth embodiments, wherein the phase change material comprises a material selected from the group consisting of: 1-dodecanol, n-octadecane, polyethylene glycol 900, 1-tetradecanol, medicinal paraffin, a paraffin wax, paraffin RT60/RT58, biphenyl, $CaCl_2.6H_2O$, $Na_2SO_4.10H_2O$, $Na_2CO_3.10H_2O$, capric acid, lauric acid, myristic acid, palmitic acid, stearic acid, and combinations thereof.

A twentieth embodiment can include the insulation system of any one of the twelfth to seventeenth embodiments, wherein the phase change material comprises a material selected from the group consisting of: $LiClO_3.3H_2O$, $ZnCl_2.3H_2O$, a eutectic water-salt solution: 22.4-23.3 wt. % NaCl solution, Paraffin C14, Paraffin C15-C16, Polyglycol E400, Formic acid, propyl pamiate, isopropyl pamiate, a salt solution, and combinations thereof.

In a twenty first embodiment, a method of making an insulated material comprises: melting a phase change material to form liquid phase change material; combining the liquid phase change material with an insulating material; and forming a composite insulation material in response to the combining.

A twenty second embodiment can include the method of the twenty first embodiment, wherein the insulating material is a porous material, wherein the porous material comprises a plurality of pores, and wherein the liquid phase change material is disposed in the plurality of pores.

A twenty third embodiment can include the method of the twenty second embodiment, further comprising: mixing a binder with the liquid phase change material prior to combining the liquid phase change material with the porous material.

A twenty fourth embodiment can include the method of the twenty second embodiment, wherein the binder comprises a material selected from the group consisting of: epoxy resin, phenoxy resin, alkyd resin, acrylic resin, vinyl resin, polyester resin, polyurethane resin, Vinyl acetate/ethylene copolymer emulsion, high solids epoxy, amine-cured epoxy, water-based latex, two-part epoxy, and mixtures thereof.

A twenty fifth embodiment can include the method of the twenty first embodiment, wherein the liquid phase change material is contained in an encapsulant, and wherein combining the liquid phase change material with the insulating material comprises: mixing the liquid phase change material in the encapsulant into the insulating material.

A twenty sixth embodiment can include the method of the twenty first embodiment, wherein the phase change material is disposed in a container, and wherein the combining the liquid phase change material with the insulating material comprises coupling the container to the insulating material.

A twenty seventh embodiment can include the method of any one of the twenty first to twenty sixth embodiments, further comprising: forming a panel from the insulated material.

A twenty eighth embodiment can include the method of the twenty seventh embodiment, further comprising: disposing a film on at least one surface of the panel.

A twenty ninth embodiment can include the method of any one of the twenty first to twenty eighth embodiments, wherein the porous material comprises a material selected from the group consisting of: a porous biomass, a porous polymer, a porous lignocellulosic fiber, a porous polyurethane foam, a porous expanded polystyrene, a porous air-entrained concrete, a porous rock wool, a porous polyisocyanurate material, a porous natural plant material, a partially delignified lignocellulosic biomass, and combinations thereof.

A thirtieth embodiment can include the method of any one of the twenty first to twenty ninth embodiments, wherein the phase change material comprises a material selected from the group consisting of: 1-dodecanol, n-octadecane, polyethylene glycol 900, 1-tetradecanol, medicinal paraffin, a paraffin wax, paraffin RT60/RT58, biphenyl, $CaCl_2.6H_2O$, $Na_2SO_4.10H_2O$, $Na_2CO_3.10H_2O$, capric acid, lauric acid, myristic acid, palmitic acid, stearic acid, and combinations thereof.

A thirty first embodiment can include the method of any one of the twenty first to thirtieth embodiments, wherein melting the phase change material comprises raising the temperature of the phase change material to between about 2-10° C. above a melting temperature of the phase change material.

A thirty second embodiment can include the method of any one of the twenty first to thirty first embodiments, wherein a mass ratio of the phase change material to the porous material is between 1:10 and 10:1.

A thirty third embodiment can include the method of any one of the twenty first to thirty second embodiments, wherein disposing the liquid phase change material into the plurality of pores comprises: pressurizing the liquid phase change material and the porous material in a vessel; and holding the pressure to dispose the liquid phase change material into the plurality of pores.

A thirty fourth embodiment can include the method of the thirty third embodiment, wherein the vessel is pressurized to 100 psia or greater.

In a thirty fifth embodiment, an insulated panel comprises: an insulation layer; and an composite insulation material disposed on at least one surface of the insulation layer, wherein the composite insulation material comprises a phase change material.

A thirty sixth embodiment can include the insulated panel of the thirty fifth embodiment, further comprising: a film disposed on at least one surface of the porous material, wherein the film is configured to seal the at least one surface of the porous material.

A thirty seventh embodiment can include the insulated panel of the thirty fifth or thirty sixth embodiment, wherein an edge of the insulated panel is configured to interlock with an adjacent insulated panel.

A thirty eighth embodiment can include the insulated panel of any one of the thirty fifth to thirty seventh embodiments, wherein a height and width of the insulated panel are in a range of from about 3 feet to about 12 feet.

A thirty ninth embodiment can include the insulated panel of any one of the thirty fifth to thirty eighth embodiments, wherein a thickness of the insulated panel is in a range of between about 0.25 inches to about 24 inches.

A fortieth embodiment can include the insulated panel of any one of the thirty fifth to thirty ninth embodiments, further comprising: a conduit disposed through the insulated panel.

A forty first embodiment can include the insulated panel of any one of the thirty fifth to fortieth embodiments, further comprising a second insulation layer, wherein the porous material is disposed between the insulation layer and the second insulation layer.

A forty second embodiment can include the insulated panel of any one of the thirty fifth to forty first embodiments, further comprising: a reinforcing support, wherein the reinforcing support comprises at least one of rebar, a long fiber, or a conduit.

A forty third embodiment can include the insulated panel of any one of the thirty fifth to forty second embodiments, further comprising: a metal facing layer disposed on the insulation layer.

A forty fourth embodiment can include the insulated panel of the forty third embodiment, wherein the metal facing layer has a thickness between about 10 microns and about 8 mm.

A forty fifth embodiment can include the insulated panel of any one of the thirty fifth to forty fourth embodiments, further comprising: an intumescent coating configured to provide fire resistance to the insulated panel.

A forty sixth embodiment can include the insulated panel of any one of the thirty fifth to forty fifth embodiments, wherein the insulated panel is configured to be used as insulation for a refrigerated compartment.

A forty seventh embodiment can include the insulated panel of any one of the thirty fifth to forty sixth embodiments, wherein the porous material comprises a material selected from the group consisting of: a porous biomass, a porous polymer, a porous lignocellulosic fiber, a porous polyurethane foam, a porous expanded polystyrene, a porous air-entrained concrete, a porous rock wool, a porous polyisocyanurate material, a porous natural plant material, a partially delignified lignocellulosic biomass, and combinations thereof.

A forty eighth embodiment can include the insulated panel of any one of the thirty fifth to forty seventh embodiments, wherein the phase change material comprises a material selected from the group consisting of: 1-dodecanol, n-octadecane, polyethylene glycol 900, 1-tetradecanol, medicinal paraffin, a paraffin wax, paraffin RT60/RT58, biphenyl, $CaCl_2.6H_2O$, $Na_2SO_4.10H_2O$, $Na_2CO_3.10H_2O$, capric acid, lauric acid, myristic acid, palmitic acid, stearic acid, and combinations thereof.

In a forty ninth embodiment, a method of providing insulation comprises: heating a first side of a composite insulation material, wherein the composite insulation material comprises the first side and a second side, wherein the composite insulation material comprises: a phase change material; melting at least a portion of the phase change material in response to the heating; and reducing heat transmission through the composite insulation material from the first side to the second side based on the melting.

A fiftieth embodiment can include the method of the forty ninth embodiment, further comprising: reducing the temperature on the first side of the composite insulation material; and solidifying the phase change material in response to reducing the temperature on the first side of the composite insulation material.

A fifty first embodiment can include the method of the forty ninth or fiftieth embodiment, wherein the insulated material further comprises: a binder, wherein the binder is mixed with the phase change material and disposed within a plurality of pores in a porous material.

A fifty second embodiment can include the method of the fifty first embodiment, wherein the binder comprises a material selected from the group consisting of: epoxy resin, phenoxy resin, alkyd resin, acrylic resin, vinyl resin, polyester resin, polyurethane resin, Vinyl acetate/ethylene copolymer emulsion, high solids epoxy, amine-cured epoxy, water-based latex, two-part epoxy, and mixtures thereof.

A fifty third embodiment can include the method of any one of the forty ninth to fifty second embodiments, wherein the composite insulation material further comprises: a thin film disposed on at least one outside surface of the composite insulation material.

A fifty fourth embodiment can include the method of the fifty third embodiment, further comprising: retaining the phase change material in the composite insulation material when at least the portion of the phase change material is melted using the thing film.

A fifty fifth embodiment can include the method of any one of the forty ninth to fifty fourth embodiments, wherein the composite insulation material comprises a material selected from the group consisting of: a porous biomass, a porous polymer, a porous lignocellulosic fiber, a porous polyurethane foam, a porous expanded polystyrene, a porous air-entrained concrete, a porous rock wool, a porous polyisocyanurate material, a porous natural plant material, a partially delignified lignocellulosic biomass, and combinations thereof.

A fifty sixth embodiment can include the method of any one of the forty ninth to fifty fifth embodiments, wherein the phase change material comprises a material selected from the group consisting of: 1-dodecanol, n-octadecane, polyethylene glycol 900, 1-tetradecanol, medicinal paraffin, a paraffin wax, paraffin RT60/RT58, biphenyl, $CaCl_2.6H_2O$, $Na_2SO_4.10H_2O$, $Na_2CO_3.10H_2O$, capric acid, lauric acid, myristic acid, palmitic acid, stearic acid, and combinations thereof.

A fifty seventh embodiment can include the method of any one of the forty ninth to fifty sixth embodiments, further comprising: one or more insulated panels coupled to the composite insulation material.

A fifty eighth embodiment can include the method of any one of the forty ninth to fifty seventh embodiments, wherein composite insulation material is a layer in a wall of a refrigeration compartment, wherein the first side faces an exterior of the refrigeration compartment, and wherein the second side faces an interior of the refrigeration compartment.

Embodiments are discussed herein with reference to the Figures. However, those skilled in the art will readily appreciate that the detailed description given herein with respect to these figures is for explanatory purposes as the systems and methods extend beyond these limited embodiments. For example, it should be appreciated that those skilled in the art will, in light of the teachings of the present description, recognize a multiplicity of alternate and suitable approaches, depending upon the needs of the particular application, to implement the functionality of any given detail described herein, beyond the particular implementation choices in the following embodiments described and shown. That is, there are numerous modifications and variations that are too numerous to be listed but that all fit within the scope of the present description. Also, singular words should be read as plural and vice versa and masculine as feminine and vice versa, where appropriate, and alternative embodiments do not necessarily imply that the two are mutually exclusive.

It is to be further understood that the present description is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present systems and methods. It must be noted that as used herein and in the appended claims (in this application, or any derived applications thereof), the singular forms "a," "an," and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this description belongs. Preferred methods, techniques, devices, and materials are described, although any methods, techniques, devices, or materials similar or equivalent to those described herein may be used in the practice or testing of the present systems and methods. Structures described herein are to be understood also to refer to functional equivalents of such structures. The present systems and methods will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although claims may be formulated in this application or of any further application derived therefrom, to particular combinations of features, it should be understood that the scope of the disclosure also includes any novel feature or any novel combination of features disclosed herein either explicitly or implicitly or any generalization thereof, whether or not it relates to the same systems or methods as presently claimed in any claim and whether or not it mitigates any or all of the same technical problems as do the present systems and methods.

Features which are described in the context of separate embodiments may also be provided in combination in a single embodiment. Conversely, various features which are, for brevity, described in the context of a single embodiment, may also be provided separately or in any suitable subcombination. The Applicant(s) hereby give notice that new claims may be formulated to such features and/or combinations of such features during the prosecution of the present Application or of any further Application derived therefrom.

What is claimed is:

1. An insulated panel comprising:
   an insulation layer;
   a composite insulation material disposed on at least one surface of the insulation layer, wherein the composite insulation material comprises a phase change material, wherein the insulation layer is composed of a porous material, wherein the porous material is a biomass-based material defined by a plurality of pores located therein, and wherein at least a portion of the phase change material is disposed in the plurality of pores of the biomass-based material to form the composite insulation material; and
   a film disposed on at least one surface of the porous material, wherein the film is configured to seal the at least one surface of the porous material.

2. The insulated panel of claim 1, wherein the insulation layer is a first insulation layer, and further comprising a second insulation layer, wherein the porous material is disposed between the first insulation layer and the second insulation layer.

3. The insulated panel of claim 1, wherein the insulated panel is configured to be used as insulation for a refrigerated compartment.

4. The insulated panel of claim 1, wherein the porous biomass-based material comprises a material selected from the group consisting of: a porous biomass, a porous natural plant material, a partially delignified lignocellulosic biomass, and combinations thereof.

5. The insulated panel of claim 1, wherein the phase change material comprises a material selected from the group consisting of: 1-dodecanol, n-octadecane, polyethylene glycol 900, 1-tetradecanol, medicinal paraffin, a paraffin wax, paraffin RT60/RT58, biphenyl, $CaCl_2.6H_2O$, $Na_2SO_4.10H_2O$, $Na_2CO_3.10H_2O$, capric acid, lauric acid, myristic acid, palmitic acid, stearic acid, and combinations thereof.

6. The insulated panel of claim 1, wherein the phase change material is mixed with a binder within the plurality of pores.

7. The insulated panel of claim 6, wherein the binder comprises a material selected from the group consisting of: epoxy resin, phenoxy resin, alkyd resin, acrylic resin, vinyl resin, polyester resin, polyurethane resin, Vinyl acetate/ethylene copolymer emulsion, high solids epoxy, amine-cured epoxy, water-based latex, two-part epoxy, and mixtures thereof.

8. The insulated panel of claim 1, wherein the phase change material is mixed with a fire retardant within the plurality of pores.

9. The insulated panel of claim 8, wherein the fire retardant comprises an organic acid, an organohalogen based fire retardant, organophosphorous based fire retardant, or any combination thereof.

10. An insulated panel consisting of:
an insulation layer;
a composite insulation material disposed on at least one surface of the insulation layer, wherein the composite insulation material is comprised of a phase change material, wherein the insulation layer is composed of a porous material, wherein the porous material is defined by a plurality of pores located therein, and wherein at least a portion of the phase change material is disposed in the plurality of pores to form the composite insulation material; and
a film disposed on at least one surface of the porous material, wherein the film is configured to seal the at least one surface of the porous material.

11. The insulated panel of claim 10, wherein the insulated panel is configured to be used as insulation for a refrigerated compartment.

12. The insulated panel of claim 10, wherein the porous material comprises a material selected from the group consisting of: a porous biomass, a porous polymer, a porous lignocellulosic fiber, a porous polyurethane foam, a porous expanded polystyrene, a porous air-entrained concrete, a porous rock wool, a porous polyisocyanurate material, a porous natural plant material, a partially delignified lignocellulosic biomass, and combinations thereof.

13. The insulated panel of claim 10, wherein the phase change material comprises a material selected from the group consisting of: 1-dodecanol, n-octadecane, polyethylene glycol 900, 1-tetradecanol, medicinal paraffin, a paraffin wax, paraffin RT60/RT58, biphenyl, $CaCl_2.6H_2O$, $Na_2SO_4.10H_2O$, $Na_2CO_3.10H_2O$, capric acid, lauric acid, myristic acid, palmitic acid, stearic acid, and combinations thereof.

14. An insulated panel consisting of:
an insulation layer;
a composite insulation material disposed on at least one surface of the insulation layer, wherein the composite insulation material is comprised of a phase change material, wherein the insulation layer is composed of a porous material, wherein the porous material is defined by a plurality of pores located therein, and wherein at least a portion of the phase change material is disposed in the plurality of pores to form the composite insulation material; and
a film disposed on at least one surface of the porous material, wherein the film is configured to seal the at least one surface of the porous material;
wherein the phase change material is mixed with a binder and a fire retardant within the plurality of pores.

15. The insulated panel of claim 14, wherein the binder comprises a material selected from the group consisting of: epoxy resin, phenoxy resin, alkyd resin, acrylic resin, vinyl resin, polyester resin, polyurethane resin, Vinyl acetate/ethylene copolymer emulsion, high solids epoxy, amine-cured epoxy, water-based latex, two-part epoxy, and mixtures thereof, and wherein the fire retardant comprises an organic acid, an organohalogen based fire retardant, organophosphorous based fire retardant, or any combination thereof.

16. A method of providing insulation, the method comprising:
heating a first side of an insulated panel, wherein the insulated panel comprises the first side and a second side, wherein the insulated panel consists of:
an insulation layer;
a composite insulation material disposed on at least one surface of the insulation layer, wherein the composite insulation material is comprised of a phase change material, wherein the insulation layer is composed of a porous material, wherein the porous material is defined by a plurality of pores located therein, and wherein at least a portion of the phase change material is disposed in the plurality of pores to form the composite insulation material; and
a film disposed on at least one surface of the porous material, wherein the film is configured to seal the at least one surface of the porous material;
melting at least a portion of the phase change material in response to the heating; and
reducing heat transmission through the insulated panel from the first side to the second side based on the melting.

17. The method of claim 16, further comprising:
reducing the temperature on the first side of the insulated panel; and
solidifying the phase change material in response to reducing the temperature on the first side of the insulated panel.

18. The method of claim 16, wherein the method further comprises:
retaining the phase change material in the insulated panel when at least the portion of the phase change material is melted using the film.

19. The method of claim 16, wherein the porous material comprises a material selected from the group consisting of: a porous biomass, a porous polymer, a porous lignocellulosic fiber, a porous polyurethane foam, a porous expanded polystyrene, a porous air-entrained concrete, a porous rock wool, a porous polyisocyanurate material, a porous natural plant material, a partially delignified lignocellulosic biomass, and wherein the phase change material comprises 1-dodecanol, n-octadecane, polyethylene glycol 900, 1-tetradecanol, medicinal paraffin, a paraffin wax, paraffin RT60/RT58, biphenyl, $CaCl_2.6H_2O$, $Na_2SO_4.10H_2O$, $Na_2CO_3.10H_2O$, capric acid, lauric acid, myristic acid, palmitic acid, stearic acid, or any combinations thereof.

20. The method of claim 16, wherein the phase change material is mixed with a binder within the plurality of pores, and wherein the binder comprises a material selected from the group consisting of: epoxy resin, phenoxy resin, alkyd resin, acrylic resin, vinyl resin, polyester resin, polyurethane resin, Vinyl acetate/ethylene copolymer emulsion, high solids epoxy, amine-cured epoxy, water-based latex, two-part epoxy, and mixtures thereof.

* * * * *